US008271112B2

(12) United States Patent
Fujihara et al.

(10) Patent No.: US 8,271,112 B2
(45) Date of Patent: Sep. 18, 2012

(54) MUSIC INFORMATION RETRIEVAL SYSTEM

(75) Inventors: Hiromasa Fujihara, Tsukuba (JP); Masataka Goto, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 900 days.

(21) Appl. No.: 12/183,432

(22) Filed: Jul. 31, 2008

(65) Prior Publication Data

US 2009/0132077 A1 May 21, 2009

(30) Foreign Application Priority Data

Nov. 16, 2007 (JP) ................................. 2007-298695

(51) Int. Cl.
*G06F 17/00* (2006.01)
(52) U.S. Cl. ........................... 700/94; 715/716; 715/727
(58) Field of Classification Search ....................... 700/94
See application file for complete search history.

(56) References Cited

U.S. PATENT DOCUMENTS

| 5,812,688 | A * | 9/1998 | Gibson .................. 381/119 |
| 7,840,289 | B2 * | 11/2010 | Buil et al. .............. 700/94 |
| 2004/0088291 | A1 | 5/2004 | Matsuzaki et al. |
| 2004/0158466 | A1* | 8/2004 | Miranda ................ 704/236 |
| 2006/0212442 | A1* | 9/2006 | Conrad et al. ........... 707/5 |
| 2008/0072740 | A1 | 3/2008 | Horii et al. |
| 2009/0315889 | A1* | 12/2009 | Tognola ................ 345/440 |

FOREIGN PATENT DOCUMENTS

| JP | 2002-014974 | 1/2002 |
| JP | 2004-152110 | 5/2004 |
| WO | 2006/075432 | 7/2006 |

OTHER PUBLICATIONS

ID3 draft specification; Copyright Mar. 28, 1998.*
Music Similarity Measures: What's the Use?, Jean-Julien Aucouturier, Francois Pachet, Sony Computer Science Lab, English Abstract Included.
Content-Based Playlist Generation: Exploratory Experiments, Beth Logan, Hewlett-Packard Labs, English Abstract Included.
A Multiple Feature Model for Musical Similarity Retrieval, Eric Allamanche, et al., Fraunhofer Institut Integrierte Schaltungen, IIS, English Abstract Included.
A Large-Scale Evaluation of Acoustic and Subjective Music Similarity Measures, Adam Berenzweig, et al., LabROSA, Columbia University, English Abstract Included.
Features for Audio and Music Classification, Martin F. McKinney, Jeroen Breebaart, Philips Research Laboratories. English Abstract Included.

(Continued)

*Primary Examiner* — Paul McCord
(74) *Attorney, Agent, or Firm* — Rankin, Hill & Clark LLP

(57) ABSTRACT

A music information retrieval system of the present invention can retrieve unknown songs including singing voices having similar voice timbres. Voice timbre features of the songs and identifiers for the respective songs are stored in voice timbre feature storage section 2. When one of the songs is selected, similarity calculation section 3 calculates voice timbre similarities between the selected song and the respective remaining songs, based on voice timbre features of the selected song and the other songs. Similar song retrieval and display section 5 displays on a display 10 a plurality of identifiers for songs which are similar to the selected song in voice timbre. Song data reproduction section 6 reproduces song data corresponding to one or more identifiers selected from among the plurality of identifiers displayed on the display 10.

2 Claims, 15 Drawing Sheets

OTHER PUBLICATIONS

A Scalable Peer-to-Peer System for Music Content and Information Retrieval, George Tzanetakis et al, Computer Science, Carnegie Mellon University, English Abstract Included.

Improvements of Audio-Based Music Similarity and Genre Classification, Elias Pampalk, et al., Austrian Research Institute for Artificial Intelligence, English Abstract Included.

Probabilistic Combination of Features for Music Classification, Arthur Hexer, et al., Institute of Medical Cybernetics and Artificial Intelligence, Center for Brain Research, Medical University of Vienna, Austria, English Abstract Included.

Independent Component Analysis for Music Similarity Computation, Tim Pohle, et al., Johannes Kepler University Linz, Austria, English Abstract Included.

Fujihara, et al., "Singer Identification Based on Accompaniment Sound Reduction and Reliable Frame Selection", Proceedings of the 6th International Conference on Music Information Retrieval (ISMIR2005), pp., 329-336 (2005).

Goto, M. "A Real-Time Music-Scene-Description System: Predominant F0 Estimation for Detecting Melody and Bassi Lines in Real-World Audio Signals", Speech Communication, vol. 43, No. 4, pp. 311-329 (2004).

Fujihara, et al. "A Singer Identification Method for Musical Pieces on the Basis of Accompaniment Sound Reduction and Reliable Frame Selection", Transactions of Information Processing Society of Japan, vol. 47 No. 6, pp. 1831-1843 (2006).

Ohishi, et al. "Discrimination Between Singing and Speaking Voices", Proceedings of the 9th European Conference on Speech Communication and Technology (Eurospeech 2005), pp. 1141-1144 (2005).

Goto, et al. "RWC Music Database: Database of Copyright-Cleared Musical Pieces and Instrument Sounds for Research Purposes", Transactions of Information Processing Society of Japan, vol. 45, No. 3, pp. 728-733 (2004).

Berenzweig, et al. "A Large-Scale Evaluation of Acoustic and Subjective Music Similarity Measures", Computer Music Journal, vol. 28, No. 2, pp. 63-76 (2004).

Tokuda, et al. "Recursion Formula for Calculation of Mel Generalized Cepstrum Coefficients", IEICE Trans. A., vol. J71-A, No. 1, pp. 128-131 (1988).

Goto, et al. "RWC Music Database: Database of Copyright-Cleared Musical Pieces and Instrument Sounds for Research Purposes", Transactions of Information Processing Society of Japan, vol. 45, No. 3, pp. 728-738 (2004).

Miyazawa, et al. "Measuring Method of Musical Similarity for Selection of Favorite Music", Collection of Lecture Papers at the 68th National Convention of Information Processing Society of Japan (IPSJ), Artificial Intelligence and Cognitive Science; Mar. 7, 2006; pp. 2-181-2-182 (seven pages, including Relevant Comments in English).

* cited by examiner

Fig.4
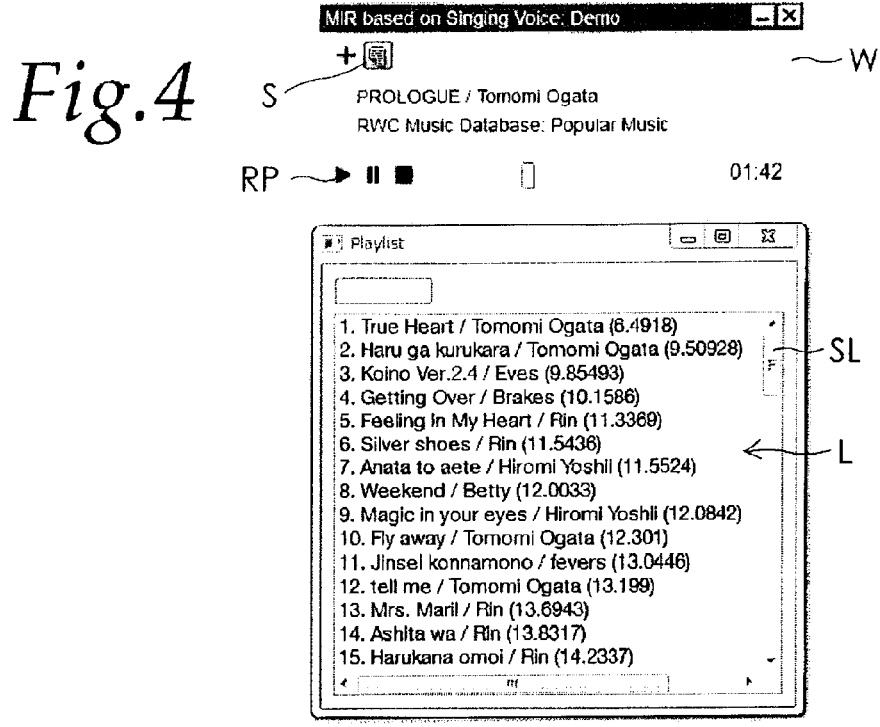
Fig.5
QUESTION 1/10
PLEASE LISTEN TO FOLLOWING THREE SONGS AND ANSWER FOLLOWING QUESTIONS BY A OR B
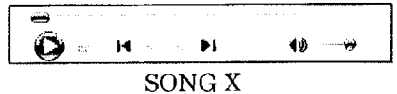
SONG X
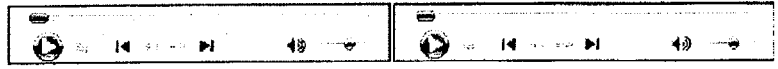
SONG A  SONG B
QUESTION 1: WHICH ONE OF SONGS A AND B IS MORE SIMILAR TO SONG X IN VOICE TIMBRE?
QUESTION 2: WHICH ONE OF SONGS A AND B IS MORE SIMILAR TO SONG X IN OVERALL TIMBRE?

Fig.6

| # | QUERY SONG ARTIST NAME | GENDER | LANGUAGE | MELODY | METHOD | RETRIEVAL RESULTS (TOP-RANKED SONGS) # | ARTIST NAME | GENDER | LANGUAGE | MELODY |
|---|---|---|---|---|---|---|---|---|---|---|
| 004 | HISAYOSHI KAZATO | MALE | JAPANESE | BLACK SOUL | MFCC | 031 | YUUICHI NAGAYAMA | MALE | JAPANESE | HOUSE |
| | | | | | OUR METHOD | 082 | SHINNYA IGUCHI | MALE | JAPANESE | HARD ROCK |
| 010 | BLAKEYS | FEMALE | JAPANESE | DANCE MUSIC | MFCC | 016 | HIROMI YOSHII | FEMALE | JAPANESE | SOUL |
| | | | | | OUR METHOD | 054 | RIN | FEMALE | JAPANESE | J-POP |
| 029 | KAZUO NISHI | MALE | JAPANESE | BLACK SOUL | MFCC | 017 | HIROMI YOSHII | FEMALE | JAPANESE | J-POP |
| | | | | | OUR METHOD | 012 | KAZUO NISHI | MALE | JAPANESE | BRITISH ROCK |
| 035 | HIROMI YOSHII | FEMALE | JAPANESE | METAL ROCK | MFCC | 036 | KAZUO NISHI | MALE | JAPANESE | METAL ROCK |
| | | | | | OUR METHOD | 094 | BETTY | FEMALE | ENGLISH | POPS |
| 045 | KOUSUKE MORIMOTO | MALE | JAPANESE | STREET FOLK | MFCC | 090 | SHINNYA IGUCHI | MALE | ENGLISH | ROCK |
| | | | | | OUR METHOD | 042 | KOUSUKE MORIMOTO | MALE | JAPANESE | CITY ROCK |
| 053 | RIN | FEMALE | JAPANESE | J-POP | MFCC | 062 | RIN | FEMALE | JAPANESE | J-POP |
| | | | | | OUR METHOD | 014 | RIN | FEMALE | JAPANESE | J-POP |
| 072 | KOUSUKE MORIMOTO | MALE | JAPANESE | NEW MUSIC | MFCC | 071 | HIROMI YOSHII | FEMALE | JAPANESE | NEW MUSIC |
| | | | | | OUR METHOD | 076 | KOUSUKE MORIMOTO | MALE | JAPANESE | STREET FOLK |
| 077 | MAKIKO HATTORI | FEMALE | JAPANESE | J-POP | MFCC | 071 | HIROMI YOSHII | FEMALE | JAPANESE | NEW MUSIC |
| | | | | | OUR METHOD | 067 | MAKIKO HATTORI | FEMALE | JAPANESE | J-POP |
| 092 | BETTY | FEMALE | ENGLISH | DANCE MUSIC | MFCC | 024 | HISAYOSHI KAZATO | MALE | JAPANESE | DANCE MUSIC |
| | | | | | OUR METHOD | 086 | BETTY | FEMALE | ENGLISH | DANCE MUSIC |
| 098 | JEFF MANNING | MALE | ENGLISH | LIVERPOOL SOUND | MFCC | 009 | KAZUO NISHI | MALE | JAPANESE | BRITISH ROCK |
| | | | | | OUR METHOD | 085 | JEFF MANNING | MALE | ENGLISH | MOTOWN |

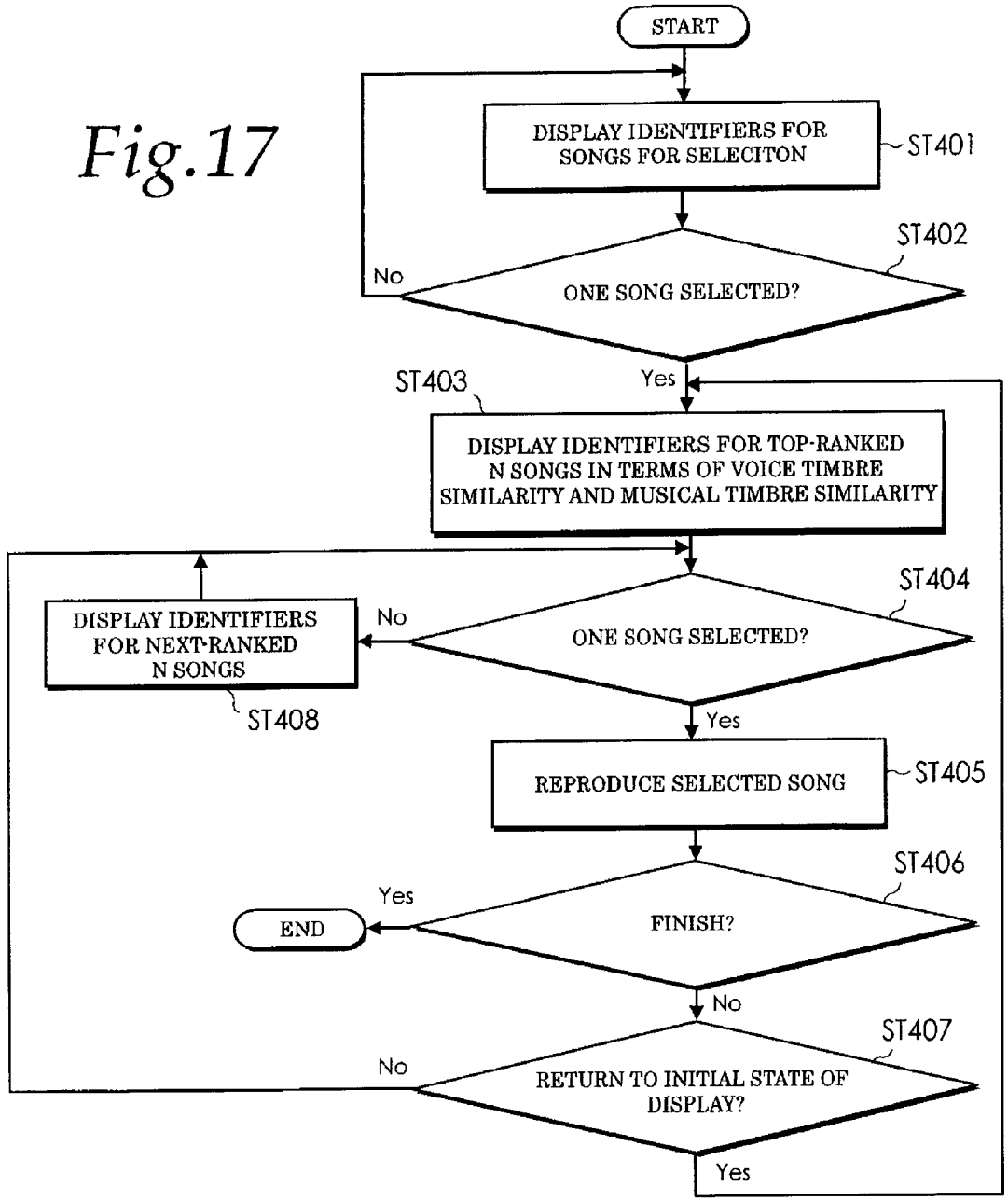

MUSIC INFORMATION RETRIEVAL SYSTEM

BACKGROUND OF THE INVENTION

The present invention relates to a music information retrieval system capable of retrieving songs that have similar voice timbres.

In recent years, music retrieval has added importance. Because of rapid and widespread diffusion of portable audio players and online music sales services, users can retrieve a favorite song from among a vast amount of songs and can listen to any music they desire to do so, at anytime and anywhere. This trend has triggered a demand to discover a song that a user has never heard before, using his favorite song as a key for the discovery. When the query of the song targeted for retrieval is not known and only vague information such as "preference" is available, the conventional method of searching for songs that only use bibliographic information such as the name of an artist or the name of a music genre is useless. In view of such a trend, a lot of studies on a music retrieval system based on the content of a song have been conducted, as shown in the following Nonpatent Documents 1 through 9.

[Nonpatent Document 1] Aucouturier, J.-J. and Pachet, F.: Music Similarity Measures: What's the Use?, Proceedings of the 3rd International Conference on Music Information Retrieval (IS-MIR2002), pp. 157-163 (2002).

[Nonpatent Document 2] Logan, B.: Content-Based Playlist Generation: Ex-ploratory Experiments, Proceedings of the 3rd International Conference on Music Information Retrieval (ISMIR2002), pp. 295-296 (2003).

[Nonpatent Document 3] Allamanche, E., Herre, J., Hellmuth, O., Kastner, T. and Ertel, C.: A Multiple Feature Model for Musical Similarity Retrieval, Proceedings of the 4th International Conference on Music Information Retrieval (ISMIR2003), pp. 217-218 (2003).

[Nonpatent Document 4] Berenzweig, A., Logan, B., Ellis, D. P. W. and Whit-man, B.: A Large-Scale Evaluation of Acoustic and Subjective Music Similarity Measures, Computer Music Journal, Vol. 28, No. 2, pp. 63-76 (2004).

[Nonpatent Document 5] McKinney, M. F. and Breebaart, J.: Features for audio and music classification, Proceedings of the 4th International Conference on Music Information Retrieval (ISMIR2003), pp. 151-158 (2003).

[Nonpatent Document 6] Tzanetakis, G., Gao, J. and Steenkiste, P.: A Scalable Peer-to-Peer System for Music Content and Information Retrieval, Proceedings of the 4th International Conference on Music Information Retrieval (ISMIR2003), pp. 209-214 (2003).

[Nonpatent Document 7] Pampalk, E., Flexer, A. and Widmer, G.: Improvements of Audio-based Music Similarity and Genre Classification, Proceedings of the 6th International Conference on Music Information Retrieval (ISMIR2005), pp. 628-633 (2005)

[Nonpatent Document 8] Flexer, A., Gouyou, F., Dixon, S. and Widmer, G.: Probabilistic combination of features for music classification, Proceedings of the 7th International Conference on Music Information Retrieval (ISMIR2006), pp. 628-633 (2006).

[Nonpatent Document 9] Pohle, T., Knees, P., Schedl, M. and Widmer, G.: Independent Component Analysis for Music Similarity Computation, Proceedings of the 7th International Conference on Music Information Retrieval (ISMIR2006), pp. 228-233 (2006)

Music retrieval techniques disclosed in these studies, however, use acoustic features such as Mel-Frequency Cepstrum Coefficient (MFCC), spectral centroid, rolloff, and flux that represent musical timbres of songs, for expressing musical content, and do not use features such as voice timbre, for expressing more detailed musical content. For this reason, conventionally, songs with similar voice timbres cannot be retrieved.

SUMMARY OF THE INVENTION

An object of the present invention is to provide a music information retrieval system capable of retrieving unknown songs which include singing voices that have similar voice timbres.

Other object of the present invention, in addition to the above object, is to provide a music information retrieval method and a music information retrieval program capable of retrieving unknown songs which include singing voices.

Other object of the present invention, in addition to the above object, is to provide a music information retrieval system capable of retrieving unknown songs which include singing voices that have voice timbres similar to voice timber of singing voice included in a certain song and include musical timbre similar to the musical timbre of another song.

Still other object of the present invention is to provide a music information retrieval system that facilitates selection of unknown songs having a similar voice timbre and a similar musical timbre.

A music information retrieval system of the present invention includes: a voice timbre feature storage section; a similarity calculation section; a similar song retrieval and a display section; and a song data reproduction section. The voice timbre feature storage section stores voice timbre features of a plurality of songs and a plurality of identifiers of the respective songs. The plurality of songs may include songs which comprise singing voices alone as well as songs which comprise singing voices or vocals and accompaniment sounds. In order to extract the voice timbre feature of each song that comprises a singing voice and accompaniment sounds, the voice timbre feature is extracted from an audio signal from which the influence of the accompaniment sounds has been reduced, or the accompaniment sounds have been reduced. For the voice timbre feature extraction, any extraction method may be employed. As the voice timbre feature, any feature that represents voice or vocal characteristics may be employed. For example, known LPC-derived mel cepstral coefficients (LPMCCs) and known $\Delta F0$s, which express a manner of singing by a singer and are temporal variation coefficients of the trajectory of the fundamental frequency $F0$, may be used as the voice timbre feature. Identifier for a song includes information to be shown on a screen of a display when song selection is performed, and may include the title, artist name, and genre of the song, and the like, for example. The voice timbre features are obtained in advance for all the songs targeted for retrieval, and are stored in the voice timbre feature storage section. When a new song is added, the voice timbre feature of the new song may be of course additionally registered.

Song data storage section stores a plurality of song data of the songs or song data in connection with the identifiers. The song data is the data corresponding to an audio signal to be used when reproduction is performed by the song data reproduction section.

The similarity calculation section calculates voice timbre similarities between one song and the respective remaining songs based on the voice timbre features of the one song and the remaining songs when the one song is selected from among the songs. In other words, the similarity calculation section calculates the similarities between the voice timbre feature of the selected one song and the respective voice timbre features of the remaining songs stored in the voice timbre feature storage section. For selection of the song, at least a part of a plurality of the identifiers for the songs may be shown on the screen of the display, and the song may be selected by selecting one of the identifiers displayed. Alternatively, the song may be selected by manually entering the title of the song into a specific entry location on the display. An arbitrary selection method may be used. An arbitrary method of calculating the voice timbre similarities may also be employed, and calculation of the voice timbre similarities is not limited to a specific similarity calculation method. For the voice timbre similarity calculation, in addition to mutual information content, a COS measure, the EMD (Earth Mover's Distance) as a distance measure, or the like, for example, may also be employed as a measure of similarity between two songs.

The similar song retrieval and display section displays on the screen of the display the identifiers for the songs including a singing voice that have the voice timbre similar to the voice timbre of the singing voice included in the one song based on the voice timbre similarities calculated by the similarity calculation section. As a display format of displaying the identifiers for the songs including a singing voice that have the voice timbre similar to the voice timbre of the singing voice included in the one song, any display format may be used if magnitude relations of the similarities can be understood. As the display format in which the magnitude relations of the similarities can be understood, the format of displaying on the screen the identifiers in descending order of the similarities, the format of displaying the identifiers one by one in descending order of the similarities, or the format of changing or setting the size of the identifier to be displayed on the display so that the size of the identifier increases in proportion to the magnitude of the similarity may be employed.

The song data reproduction section extracts from the song data stored in the song data storage section one or more song data corresponding to one or more identifiers which are selected from among the identifiers displayed on the screen of the display, and reproduces the extracted song data, thereby allowing a user to listen to the selected song. This reproduction of the song allows a retrieval result to be actually checked. The song data may be reproduced from the start of the song data, by the song data reproduction section. Alternatively, only the so-called chorus of the song may be reproduced. Alternatively, the song data of an appropriate vocal portion selected from among vocal portions of the song may be reproduced.

According to the present invention, songs including singing voices having voice timbres similar to the voice timbre of a favorite song of the user may be retrieved from a plurality of unknown songs, with high accuracy.

Songs that have similar musical timbres as well as similar voice timbres may be selected for retrieval. For that purpose, a voice timbre feature and musical timbre feature storage section and a musical timbre similarity calculation section are provided. The voice timbre feature and musical timbre feature storage section stores voice timbre features and musical timbre features of a plurality of songs and identifiers for the respective songs. In order to extract the musical timbre feature of a song that comprises a vocal and accompaniment sounds, the musical timbre feature is extracted from an audio signal from which the influence of the vocal has been reduced, or the vocal has been reduced. For the musical timbre feature extraction, any extraction method may be employed. As the musical timbre feature, any feature that represents characteristics of accompaniment sounds may be used. A feature such as Mel-Frequency Cepstrum Coefficient (MFCC), Audio Spectrum Centroid (ASC), roll off, or flux may be used.

The musical timbre similarity calculation section calculates musical timbre similarities between one song and the respective remaining songs based on the musical timbre features of the one song and the remaining songs when the one song is selected from among a plurality of songs. In other words, the musical timbre similarity calculation section calculates the similarities between the musical timbre feature of the selected one song and the respective musical timbre features of the remaining songs stored in the musical timbre feature storage section. An arbitrary method of calculating the musical timbre similarities maybe employed, and calculation of the musical timbre similarity is not limited to a specific similarity calculation method. For the musical timbre similarity calculation as well, the mutual information content may be used as a similarity measure between two songs. As the similarity measure, the COS measure, the EMD (Earth Mover's Distance) as the distance measure, or the like, for example, may be employed, in addition to the mutual information.

A similar song retrieval and display section displays on the display a plurality of identifiers for songs including a singing voice that have the voice timbre similar to the voice timbre of the singing voice included in the one song and having a musical timbre similar to the musical timbre of the one song, based on the voice timbre similarities calculated by the voice timbre similarity calculation section and the musical timbre similarities calculated by the musical timbre similarity calculation section. When retrieving the songs including a singing voice that have the voice timbre similar to the voice timbre of the singing voice included in the one song and having a musical timbre similar to the musical timbre of the one song, an average value of the voice timbre similarity and the musical timbre similarity of the song may be used as a reference. Based on an average value of a weighted voice timbre similarity and a weighted musical timbre similarity of the song as a reference, the retrieval may be performed. Then, the identifiers for the retrieved songs may be arranged on the screen of the display in descending order of the average values. Alternatively, a display format, in which one of a vertical axis and a horizontal axis indicates the voice timbre similarity, and the other of the vertical axis and the horizontal axis indicates the musical timbre similarity, may be employed. In this display format, an identifier for a song is displayed at or in the vicinity of the point of intersection of a first virtual line and a second virtual line. The first virtual line is orthogonal to the one of the vertical and horizontal axes at a point indicating the voice timbre similarity of the song. The second virtual line is orthogonal to the other of the vertical and horizontal axes at a point indicating the musical timbre similarity of the song. With this display format, the identifiers for the songs may be displayed, being scattered on a plane. In this display format, the respective identifiers for the songs which are arranged or positioned on a virtual center line, has the voice timbre similarity and musical timbre similarity that are equal to each other. The virtual center line extends from a point of intersection between the vertical axis and the horizontal axis in a 45-degree angle direction between the vertical axis and the horizontal axis. Wherein an identifier for a song whose vocal timbre similarity and musical timbre similarity are both the largest, is arranged located on the point of intersection between the vertical axis and the horizontal axis. The songs corresponding to the identifiers in the vicinity of the point of intersection are similar to the song on the point of intersection in both voice timbre and musical timbre. Therefore, by selecting the identifier in the vicinity of the point of intersection, it becomes possible to quickly identify a song that is similar both in voice timbre and musical timbre.

A query song used for retrieving songs with similar voice timbres may be different from a query song used for retrieving songs with similar musical timbres. By using the two query songs, songs that are similar to a certain song (such as a rock song sung by one female) in voice timbre and that are similar to another song (such as a pop song sung by a chorus group) in musical timbre may be retrieved. In this case, a vocal feature and musical timbre feature storage section, a voice timbre similarity calculation section, a musical timbre similarity calculation section, a similar song retrieval and display section, and a song data reproduction section are used. The voice timbre similarity calculation section calculates voice timbre similarities between one song and the respective remaining songs based on the voice timbre features of the one song and the remaining songs when the one song is selected from among the songs. The musical timbre similarity calculation section calculates musical timbre similarities between another song and the respective remaining songs based on the musical timbre features of the second song and the remaining songs when another song is selected from among the songs. The similar song retrieval and display section retrieves a plurality of identifiers for songs including a singing voice that have the voice timbre similar to the voice timbre of the singing voice included in the one song and having a musical timbre similar to the musical timbre of the another song, based on the voice timbre similarities calculated by the voice timbre similarity calculation section and the musical timbre similarities calculated by the musical timbre similarity calculation section. An arbitrary display format may be used for displaying the identifiers on the display. The display format as described above, for example, in which one of the vertical axis and the horizontal axis indicates the voice timbre similarity, and the other of the vertical axis and the horizontal axis indicates the musical timbre similarity, may be employed. In this display format, an identifier for a song is displayed at or in the vicinity of the point of intersection of the first virtual line and the second virtual line. The first virtual line is orthogonal to the one of the vertical and horizontal axes at a point indicating the voice timbre similarity of the song. The second virtual line is orthogonal to the other of the vertical and horizontal axes at a point indicating the musical timbre similarity of the song. When this display format is used, a plurality of songs including a singing voice that have the voice timbre similar to the voice timbre of the singing voice included in the one song and having a musical timbre similar to the musical timbre of the another song can be recognized at a glance, together with degrees of the similarities.

In the basic inventions described above, the similarities are calculated for each of retrievals. The voice timbre and musical timbre similarities may be calculated in advance and may be stored in similarity storage section. For retrieval of songs having similar voice timbres, the similarity storage section is provided. In the similarity storage section, identifiers for the songs and a plurality of voice timbre similarities between each one of the songs and the respective remaining songs calculated based on voice timbre features of the songs and are stored. When one song is selected from among the songs, the similar song retrieval and display section reads out the voice timbre similarities between the one song and the respective remaining songs from the similarity storage section, and displays on a screen of a display a plurality of identifiers for songs including a singing voice having the voice timbre similar to the voice timbre of the singing voice included in the one song, based on the voice timbre similarities. With this arrangement, a retrieval time may be reduced because the similarities are calculated in advance.

For retrieval of songs including a singing voice that have the voice timbre similar to the voice timbre of a singing voice of one song and having the musical timbre similar to the musical timbre of the one song, the similarity storage section stores the identifiers for the songs, a plurality of voice timbre similarities between each one of the songs and the respective remaining songs calculated based on the voice timbre features of each one of the songs and the remaining songs, and a plurality of musical timbre similarities between each one of the songs and the respective remaining songs calculated based on musical timbre features of each one of songs and the remaining songs. Then, the similar song retrieval and display section reads out the voice timbre similarities and the musical timbre similarities between one song and the respective remaining songs from the similarity storage section when the one song is selected from among the songs and displays on a display a plurality of the identifiers for songs including the singing song that has the voice timbre similar to the voice timbre of the singing voice included in the one song and having the musical timbre similar to the musical timbre of the one song, based on the voice timbre similarities and the musical timbre similarities. With this arrangement, a retrieval time may be reduced because the similarities are calculated in advance.

When the present invention is specified as the invention of a method implemented by a computer, the computer executes the following steps of: storing in voice timbre feature storage section voice timbre features of songs and a plurality of identifiers for the respective songs; storing in song data storage section a plurality of song data of the songs in connection with the identifiers; calculating voice timbre similarities between one song and the respective remaining songs based on the voice timbre features of the one song and the remaining songs by similarity calculation section when the one song is selected from among the songs; retrieving the identifiers for songs including a singing voice that has a voice timbre similar to the voice timbre of the song voice included in the one song, based on the voice timbre similarities calculated by the similarity calculation section; and extracting from the plurality of song data stored in the song data storage section song data corresponding to one of the identifiers when the one the identifiers is selected from among the identifiers displayed on the display, and reproducing the extracted song data, by song data reproduction section when a command for reproduction is input.

The present invention may be specified as a program that causes the computer to execute the steps described above. The program may be recorded in a computer-readable record medium.

According to the present invention, songs including a singing voice that have the voice timbre similar to the voice timbre of the singing voice included in the favorite song of the user may be retrieved from a plurality of unknown songs, with high accuracy. Further, songs including a singing voice that have the voice timbre similar to the voice timbre of the singing voice included in the favorite song of the user and having a musical timbre similar to the musical timbre of the favorite song may be retrieved from the unknown songs, with high accuracy. Songs including a singing voice that have the voice timbre similar to the voice timbre of the singing voice included in the favorite song of the user and having a musical timbre similar to the musical timbre of another favorite song of the user may be retrieved from a plurality of unknown songs, with high accuracy.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIG. 4 is a diagram showing a display of retrieval results when retrieval has been actually performed using a display screen.

FIG. 5 shows a screen where questions are presented to subjects.

FIG. 6 is a table showing retrieval results when ten query songs have been selected.

FIG. 17 is a flowchart for an algorithm for other program used when the music information retrieval system shown in FIG. 15 is implemented by the computer.

DETAILED DESCRIPTION OF PREFERRED EMBODIMENTS

Figure 1:
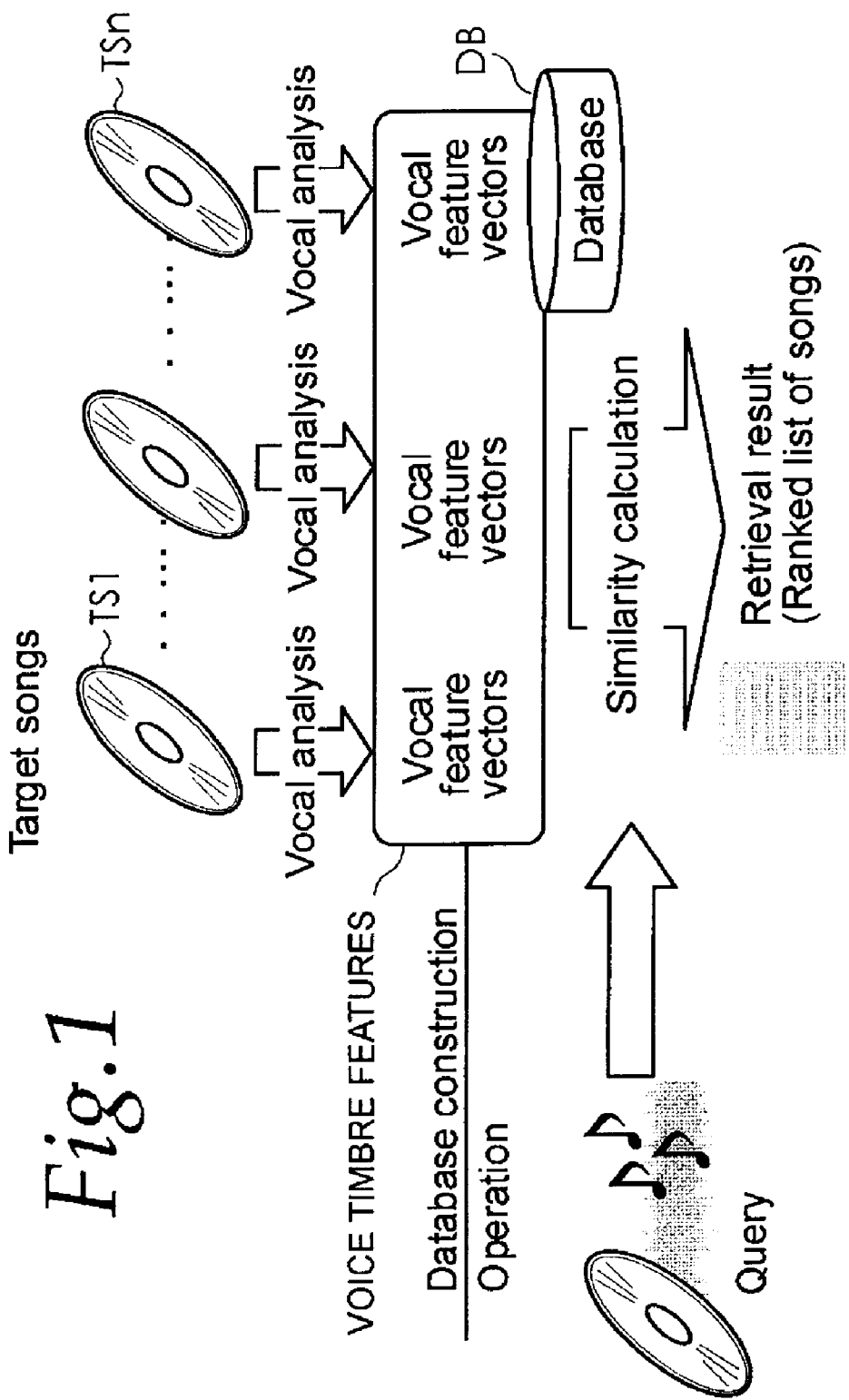
FIG. 1 is a diagram conceptually showing the basic technical concept of a music information retrieval system in a first embodiment of the present invention.

Embodiments of a music information retrieval system and a music information retrieval method in the present invention will be described below in detail with reference to drawings. FIG. 1 is a diagram conceptually showing the basic technical concept of the musical information retrieval system in a first embodiment of the present invention. The musical information retrieval system in FIG. 1, retrieves songs including singing voice that have a voice timbre similar to a voice timbre of a singing voice of a song queried or selected by a user, from among songs (target songs) TS1 to TSn registered in a database in advance, and presents the retrieved songs to the user. This system broadly comprises a database construction stage (vocal analysis of audio signals of songs and extraction of vocal features or voice timbre features of the songs) and an operation stage (retrieval of songs). In the database construction stage, the songs for retrieval are stored in a database DB after having been downloaded or ripped from CDs. The system then analyzes respective songs, and extracts a voice timbre feature that expresses a singing voice or the voice timbre of the singing voice. When the user enters a favorite song as a query to the system in the operation stage, the system analyzes the query song and extracts the feature that represents the voice timbre of the query song. Then, the system calculates the voice timbre similarities between the query song and the remaining songs in the database and outputs a ranked list of songs with high similarities as retrieval results.

Figure 2:
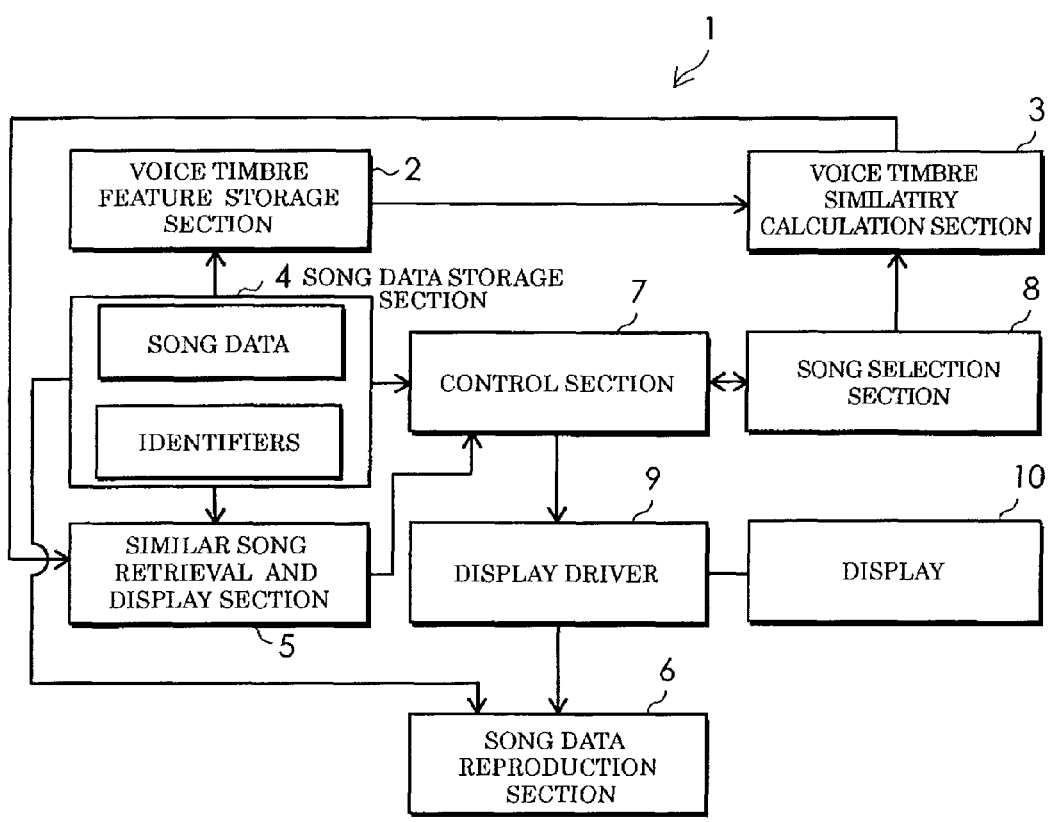
FIG. 2 is a block diagram showing a specific configuration of the music information retrieval system that embodies the concept in FIG. 1.

FIG. 2 is a block diagram showing a specific configuration of a music information retrieval system 1 that embodies the concept shown in FIG. 1. The music information retrieval system 1 comprises a voice timbre feature storage section 2, a voice timbre similarity calculation section 3, a song data storage section 4, a similar song retrieval and display section 5, a song data reproduction section 6, a control section 7, a song selection section 8, a display driver 9, and a display 10. The display driver 9 drives the display 10 based on an input signal to produce various displays on a screen of the display 10. The song selection section 8 is an input means which is operated by the user to select a song from songs on various input screens displayed on the display 10. The song selection section 8 is operation section such as a mouse for moving a cursor on a personal computer, for example. The control section 7 performs a central role in executing various programs to process data when the system is implemented by a computer. The control section 7 performs signal processing on data from the respective sections and outputs the processed data to the display driver 9 as the input signal.

The voice timbre feature storage section 2 is a database that stores the vocal features or voice timbre features of the songs TS1 to TSn and identifiers of the songs. Songs which comprise singing voices alone as well as songs which comprise singing voices and accompaniment sounds are included in the songs in the database. In order to extract the voice timbre features of songs that comprises a vocal and accompaniment sounds and store the voice timbre features in the voice timbre feature section 2, the voice timbre feature may be extracted from an audio signal from which the influence of the accompaniment sounds has been reduced, or the accompaniment sounds have been reduced. For the voice timbre feature extraction, any extraction method may be employed. As the voice timbre feature, any feature that represents vocal characteristics or voice timbre may be employed.

In this embodiment, the voice timbre feature to be stored in the voice timbre feature storage section 2 is extracted as follows. First, in order to calculate feature vectors (vocal feature vectors) that represent vocal characteristics or voice timbre of the singing voice, a feature extraction method used in the singer identification method proposed before by inventors of the present invention will be employed. This method is disclosed in "Fujihara, H., Kitahara, T., Goto, M., Komatani, K., Ogata, T. and Okuno, H. G.: Singer Identification Based On Accompaniment Sound Reduction and Reliable Frame Selection, Proceedings of the 6th International Conference on Music Information Retrieval (ISMIR2005), pp. 329-336 (2005)". When this method is used, the influence of accompaniment sounds which are mixed with the singing voice of a song can be reduced. For this reason, this feature vector (vocal feature vector) can represent the voice timbre of the singing voice better than a feature like MFCC that just represents a mixture of the accompaniment sounds and the singing voice.

This feature extraction method comprises three processing: accompaniment sound reduction, feature extraction, and reliable frame selection. In the accompaniment sound reduction, the singing voice is segregated and resynthesized on the basis of the harmonic structure of the singing voice in order to reduce the influence of the accompaniment sounds. Then, in the feature extraction, the feature is calculated from the segregated singing voice. In the reliable frame selection, reliable vocal portions (frames) are selected from the extracted feature vectors, and unreliable portions that does not contain singing voices or are highly influenced by accompaniment sounds are removed.

First, the accompaniment sound reduction will be described. In the accompaniment sound reduction, the musical timbre of the song is resynthesized, thereby reducing the influence of the accompaniment sounds. The accompaniment sound reduction comprises the following three processing of:

(1) estimating the fundamental frequency (F0) of the vocal musical timbre using the PreFEst method that has been proposed before by Masataka Goto, who is an inventor of the present invention. The PreFEst method was disclosed in "Goto, M.: A realtime music-scene-description system: predominant-F0estimation for detecting melody and basslines in real-world audio signals, Speech Communication, Vol. 43, No. 4, pp. 311-329 (2004)".

(2) extracting the harmonic structure of the vocal musical timbre on the basis of the estimated fundamental frequency F0.

(3) resynthesizing the audio signal of the vocal musical timbre using a sinusoidal model.

The PreFEst method is used to estimate the fundamental frequency of the vocal musical timbre. The preFEsT method estimates the most predominant fundamental frequency F0 in sound mixtures within a limited frequency range. The vocal musical timbre line tends to have the most predominant harmonic structure in middle- and high-frequency regions. For this reason, by appropriately limiting the frequency range and applying the PreFEst method, the fundamental frequency F0 of the vocal musical timbre can be estimated.

Next, using the estimated fundamental frequency F0, the amplitude of the fundamental frequency component and harmonic components is extracted. For extraction of each harmonic component, r cent error is allowed and the local maximum amplitude in the allowed range is extracted. A frequency $F_l^{(t)}$ given by the following Expression 1 and an amplitude $A_l^{(t)}$ of an lth overtone (l=1, ..., L) given by the following Expression 2 at a time (t) are represented as the following Expressions 3 and 4:

$$F_l^{(t)} \quad \text{Expression 1}$$

$$A_l^{(t)} \quad \text{Expression 2}$$

$$F_l^{(t)} = \underset{F}{\operatorname{argmax}} |S^{(t)}(F)| \left( l\overline{F}^{(t)}\left(1 - 2^{\frac{r}{1200}}\right) \le F \le l\overline{F}^{(t)}\left(1 + 2^{\frac{r}{1200}}\right) \right) \quad \text{Expression 3}$$

$$A_l^{(t)} = |S^{(t)}(F_l)| \quad \text{Expression 4}$$

where $S^{(t)}(F)$ indicates the complex spectrum. The fundamental frequency F0 is estimated by the following Expression 5.

$$\overline{F}^{(t)} \text{PreFEst} \quad \text{Expression 5}$$

In experiment examples in this embodiment which will be described later, r was set to 20.

Finally, using the sinusoidal model, the audio signal of the musical timbre (Expression 6) is resynthesized by using the extracted harmonic structure.

$$F_l^{(t)} \text{ and } A_l^{(t)} \quad \text{Expression 6}$$

Changes in phase are approximated using a quadratic function so that a frequency may change linearly. Changes in amplitude are also linearly approximated. Resynthesized audio signals, s(k) are expressed as:

$$s(k) = \sum_{l=1}^{L} s_l(k) \quad \text{Expression 7}$$

$$s_l(k) = \left\{ (A_l^{(t+1)} - A_l^{(t)}) \frac{k}{K} + A_l^{(t)} \right\} \sin(\theta_l(k)) \quad \text{Expression 8}$$

$$\theta_l(k) = \frac{\pi(F_l^{(t+1)} - F_l^{(t)})}{K} k^2 + 2\pi F_l^{(t)} k + \theta_{l,0} \quad \text{Expression 9}$$

where k represents a time in units of seconds and k=0 corresponds to the time (t). K represents the duration between the time t and a time (t+1) in units of seconds. $\theta_{l,0}$ represents the initial phase.

Next, the feature extraction will be described. From the resynthesized audio signals, the following two types of features are extracted.

LPC-derived mel cepstral coefficients (LPMCCs) (disclosed in "Recursion formula for calculation of mel generalized cepstrum coefficients" by Keiichi Tokuda, Takao Kobayashi, and Satoshi Imai, IEICE Trans. A, Vol. J71-A, No. 1, pp. 128-131 (1988))

It is known that a feature that expresses individual characteristics of an audio signal is included in the spectral envelope of the audio signal. Then, this embodiment uses LPMCCs as a spectral feature that expresses such an envelope. In experiments for singer identification conducted by the inventors, it is confirmed that the LPMCCs represent individuality of a singer better than mel-frequency cepstral coefficients (MFCCs) often used for music modeling. This superiority of the LPMCCs is described in "Singer Identification Based on Accompaniment Sound Reduction and Reliable Frame Selection", by Hiromasa Fujihara, Tetsuro Kitahara, Masataka Goto, Kazunori Komatani, Tetsuya Ogata, and Hiroshi G. Okuno, Transactions of Information Processing Society of Japan, Vol. 47, No. 6, pp. 1831-1843 (2006).

ΔF0

As a feature that expresses a manner of singing by a singer, ΔF0s, which are temporal variation coefficients of the trajectory of the fundamental frequency F0, are used. Description of the ΔF0s will be omitted, because the ΔF0s are described in "Ohishi, Y., Goto, M., Itou, K. and Takeda, K.: Discrimination between Singing and Speaking Voices, Proceedings of 9th European Conference on Speech Communication and Technology (Eurospeech 2005), pp. 1141-1144 (2005)". This thesis was disclosed by the inventors and others.

Since a singing voice tends to have great temporal variations in the F0 thereof for a short period in consequence of vibrato or overshooting, this feature is expected to express characteristics of the singer well.

Next, the reliable frame selection will be described. In the PreFEst method, a musical timbre is simply defined as the most predominant frequency F0. Thus, resynthesized audio signals may include vocal sounds or singing voices in singing sections, but may also include other instrument sounds in interlude sections. Further, when volumes of accompaniment sounds are large even in a singing section, are synthesized vocal sound or singing voices maybe greatly distorted. For this reason, the feature vectors obtained in such a singing section may partly include unreliable portions. In this embodiment, such unreliable portions are removed by the reliable frame selection, thereby allowing similarity calculation using only reliable features. In order to achieve this, two kinds of Gaussian mixture models (GMMs), which are a vocal GMM $\lambda_V$ and a non-vocal GMM $\lambda_N$, are introduced. The vocal GMM $\lambda_V$ is trained on features extracted from singing sections, while the non-vocal GMM $\lambda_N$ is trained on features extracted from interlude sections. When a feature x is given, likelihoods for the vocal and non-vocal GMMs given by the following Expressions 10 and 11 represent how this feature x is like a vocal sound or singing voices or a non-vocal instrument sound, respectively.

$$p(x|\lambda_V) \quad \text{Expression 10}$$

$$p(x|\lambda_N) \quad \text{Expression 11}$$

The likelihood for the vocal and non-vocal GMMs, represent how the feature vector is like a vocal or a non-vocal instrument, respectively. Using these likelihoods and the following formula 12, it is determined whether the feature x is reliable or not.

$$\log p(x|\lambda_V) - \log p(x|\lambda_N) \underset{\text{not-reliable}}{\overset{\text{reliable}}{\gtrless}} \eta \quad \text{Expression 12}$$

where $\eta$ indicates a threshold. It is difficult to set a constant as the threshold for all songs. This is because if the threshold is too high in a song throughout which is greatly influenced by accompaniment sounds, the number of reliable frames that can be selected may be extremely reduced. Then, in this embodiment, the threshold is automatically determined according to each song, so that 15% of whole features in the song are selected. The voice timbre features are obtained in advance for all the songs targeted for retrieval, and are stored in the voice timbre feature storage section 2. In this embodiment, the voice timbre features in a reliable frame of any song are stored in the voice timbre feature storage section 2, together with or in connection with the identifiers of the songs. When a new song is added, the voice timbre feature of the new song may be of course additionally registered in the voice timbre feature storage section 2. The identifier of a song includes information to be shown on the display when the song is selected. The information includes the title, artist name, genre of the song, or the like, for example.

The song data storage section 4 stores a plurality of song data, corresponding to the identifiers of the songs. Song data is the data corresponding to an audio signal to be used when reproduction is performed by the song data reproduction section. The control section 7 controls the display driver 9 to display a plurality of identifiers of songs for song selection on a screen of the display 10. The user selects a favorite song as a query based on the identifiers for the songs displayed on the screen of the display 10, using the song selection section 8 such as the mouse. An arbitrary configuration of the song selection section 8 may be employed. A part of the identifiers for the songs which are retrieved for query song selection, may be shown on the display 10, and the query song may be selected by selecting one of the identifiers displayed. Alternatively, the query song may be selected by manually entering the title of the favorite song into a predetermined input window on a specific entry location made on the screen of the display 10. An arbitrary selection method may be used. When identifier on the favorite song (such as the title of the song) is entered into the predetermined input window on the screen, a keyboard input device will constitute a portion of the song selection section 8. A command signal from the song selection section 8 is then processed by the control section 7.

When the query song is selected, the similarity calculation section 3 reads out the voice timbre feature of the selected song and the voice timbre features of the remaining songs from the voice timbre feature storage section 2, and calculates the voice timbre similarity between the selected one query song and each of the remaining songs. In other words, the similarity calculation section 3 calculates the similarities between the voice timbre feature of the selected query song and the respective voice timbre features of the remaining songs stored in the voice timbre feature storage section. An arbitrary similarity calculation method may be used in the similarity calculation section 3. In this embodiment, as a similarity measure between two songs, mutual information content is used.

In this embodiment, in order to use the mutual information content as the similarity measure between two songs X and Y, a probability distribution of the feature vectors for each song is modeled, using a Gaussian Mixture Model (GMM). Then, parameters of the GMM are estimated for each song by using the EM algorithm and the feature vectors extracted from each song. Then, a similarity $d_{CE}(X,Y)$ between the song X and the song Y is calculated using the following expression:

$$d_{CE}(X,Y) = \log \prod_i \frac{N_{GMM}(x_i;\theta_X)}{N_{GMM}(x_i;\theta_Y)} + \log \prod_j \frac{N_{GMM}(y_j;\theta_Y)}{N_{GMM}(y_j;\theta_X)} \quad \text{Expression 13}$$

where $x_i$ and $y_j$ represent feature vectors in the songs X and Y, respectively. These feature vectors are selected by the reliable frame selection. $\theta_X$ and $\theta_Y$ represent GMM parameters of the songs X and Y, respectively. $N_{GMM}(x;\theta)$ represents the probability density function of the GMM with parameter $\theta$.

The similar song retrieval and display section 5 outputs a command for displaying on the display 10 a plurality of identifiers for songs including a singing voice that have the voice timber similar to the voice timbre of the singing voice included in the query song, based on the voice timbre similarities calculated by the similarity calculation section 3. By the command, the control section 7 acts to display the identifiers for the songs including similar singing voices on a screen of the display 10. Any display format may be used if magnitude relations of the similarities can be understood. As the display format in which the magnitude relations of the similarities can be understood, one of the following formats may be used: the format of arranging and displaying on the screen the identifiers in descending order of the similarities, the format of displaying on the screen the identifiers one by one in descending order of the similarities, and the format of setting the size of the identifiers to be displayed on the screen so that the size of the identifier increases in proportion to the magnitude of the similarity.

When one or more identifiers are selected from among the plurality of identifiers displayed on the screen by using the song selection section 8, the song data reproduction section 6 extracts song data corresponding to the selected one or more identifiers from among the plurality of song data stored in the song data storage section 4, and reproduces the selected song data, thereby allowing the user to listen to a selected song. This reproduction of the song allows a retrieval result to be actually checked. When a plurality of identifiers is selected, a plurality of corresponding song data may be reproduced in the order of selection, or in descending order of voice timbre similarities.

The song data may be reproduced from the start of the song data, by the song data reproduction section 6. Alternatively, only the so-called chorus part of the song may be reproduced. Alternatively, the song data of an appropriate portion selected from among a plurality of vocal portions of the song may be reproduced.

Figure 3:
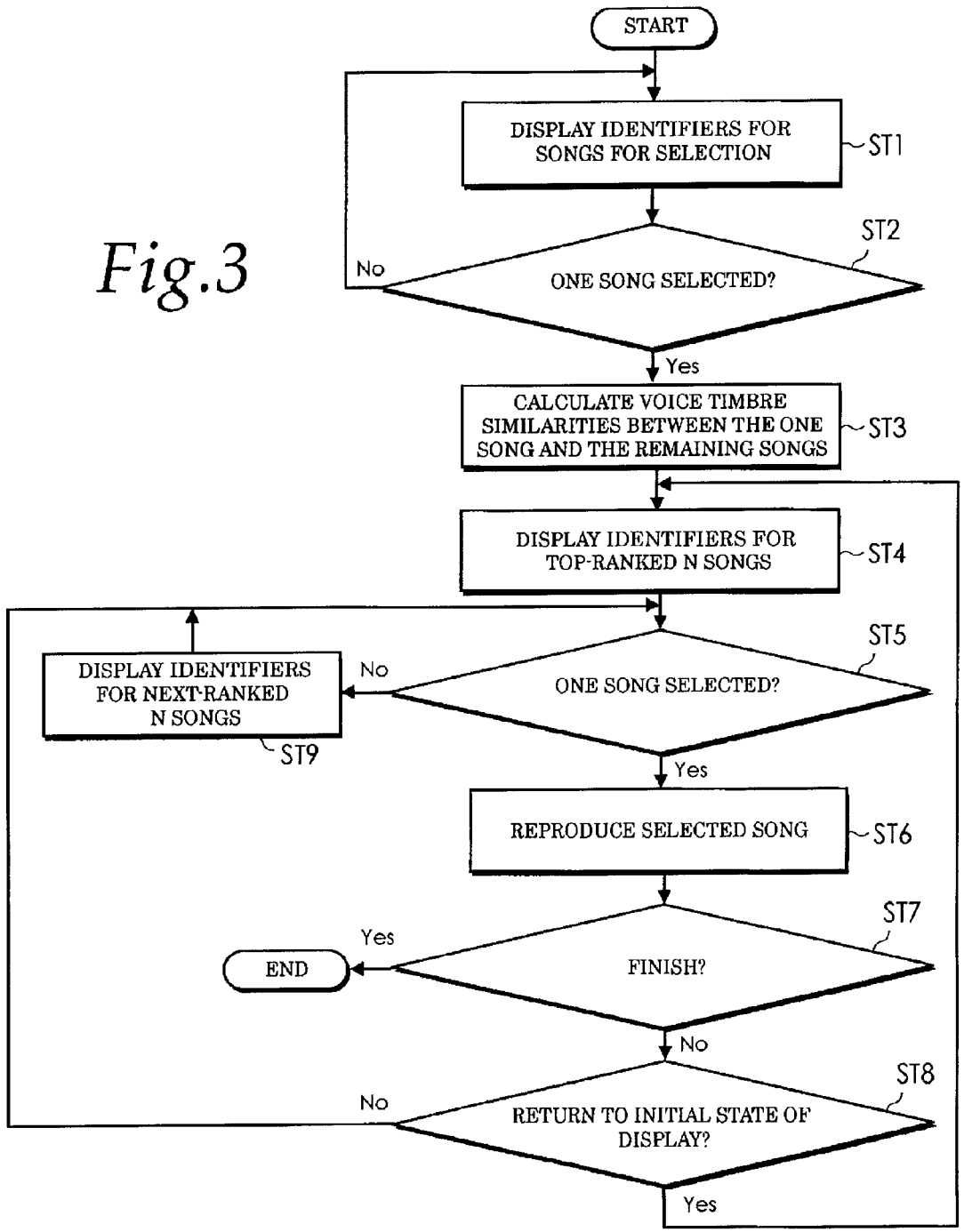
FIG. 3 is a flowchart showing an algorithm for a program used when the music information retrieval system in the first embodiment in FIG. 2 is implemented by a computer.

FIG. 3 is a flowchart showing an algorithm for a computer program used for the music information retrieval system 1 shown in FIG. 2 which is implemented by the computer. Before the program is executed in the computer, the voice timbre features of a plurality of songs and a plurality of identifiers for the respective songs are stored in the voice timbre feature storage section 2, as a preparatory stage. Further, a plurality of song data is stored in the song data storage section 4, together with or in connection with the identifiers. In step ST1, a plurality of identifiers for songs for selection is displayed on the screen of the display. If one song is selected from among the songs for selection in step ST2, the operation proceeds to step ST3. FIG. 4 shows a display of retrieval results when retrieval has been actually performed using the screen of the display 10. In this embodiment, a favorite song (which is a query) is selected using this screen. If identifier for the favorite song is clicked from among a plurality of song titles and artist names, which are the identifiers, displayed on a candidate list display portion L, the selected identifier is displayed on an input window portion W. If a retrieval button S is clicked, step ST3 or voice timbre similarity calculation is started. The candidate list display portion L on the screen is used as a display portion of displaying retrieval results as well, which will be described later. If there is no favorite song among the songs displayed on the candidate list display portion L, a slide button SL may be slid, thereby allowing display of next-ranked N songs. In step ST3, based on the voice timbre feature of the selected one song and the voice timbre features of the remaining songs, voice timbre similarities between the one song and the respective remaining songs are calculated. Then, in step ST4, based on the voice timbre similarities calculated by the similarity calculation section 3, the identifiers for top-ranked N songs including a singing voice that have the voice timbre similar to the voice timbre of the singing voice included in the one song is shown on the display. In this embodiment, the songs to be displayed on the candidate list display portion L of the display screen shown in FIG. 4 are rearranged in descending order of the voice timbre similarities and are then displayed. Then, in step ST5, one identifier is selected from among the plurality of identifiers displayed on the candidate list display portion L on the display 10 by clicking. Then, if a reproduction button RP is clicked to receive a reproduction command, song data corresponding to the selected identifier is extracted from the plurality of song data stored in the song data storage section 4 and is reproduced by the song data reproduction section 6 in step ST6. If an identifier for the query song which an user wants to select is not included in the plurality of identifiers displayed on the candidate list display portion L, the user can slide button SL, thereby displaying new identifiers for next-ranked N songs. If one song has been reproduced in step ST6 and another song is then to be reproduced, the operation proceeds to step ST8. In step ST8, it is determined whether display of the candidate list display portion L is returned to an initial state or not. If the display is returned to the initial state, the operation is returned to step ST4. If song selection is made again using the candidate songs currently displayed without returning the display to the initial state, the operation is returned to step ST5.

A plurality of songs may be selected in step ST5. If the plurality of songs may be selected, these songs may be reproduced in step ST6 in the order of selection, or may be reproduced in descending order of the voice timbre similarities.

The screenshot in FIG. 4 displays retrieval results when an experiment has been actually conducted using this embodiment. A condition of this experiment and the retrieval results will be described. First, for training a vocal GMM and a non-vocal GMM, 25 songs were selected from among the "RWC Music Database: Popular Music" (RWC-MDB-P-2001), which is disclosed in "RWC Music Database: Database of Copyright-cleared Musical Pieces and Instrument Sounds for Research Purposes," by Masataka Goto, Hiroki Hashiguchi, Takuichi Nishimura, and Ryuuichi Oka, Transactions of Information Processing Society of Japan, Vol. 45, No. 3, pp. 728-738 (2004). Then, the 25 songs were used. Then, 75 songs from the database RWC-MDB-P-2001 that had not been used for constructing the vocal and non-vocal GMMs were registered in the song data storage section 4 as a database of the system for retrieval. In an operation example in FIG. 4, "PROLOGUE" sung by a female singer Tomomi Ogata (RWC-MDB-P-2001 No. 7) is input as a query. When the query song is given and then the user depresses a search button S, retrieved songs are sequentially output on the candidate list display portion L in descending order of voice timbre similarities as retrieval results after approximately 20 seconds taken for calculation of the voice timbre similarities. In this example, the retrieval results are displayed in the order of rank, song title, artist name, and similarity. When the user clicks a song listed among the retrieval results and then clicks the reproduction button RP or double-clicks display of the song, the song data is read into the song data reproduction section 6, so that reproduction starts. Even when other song was input as a query, selected top ten songs were felt to be similar to the query song in voice timbre, in most cases. In the example in FIG. 4, selected top 21 songs were sung by female singers, like the query song. Voice timbres of the top 15 songs in FIG. 4 were similar to the voice timbre of the query song. Other songs sung by "Tomomi Ogata", who is the singer of the query song, were ranked in 10th and 12th places, which are comparatively lower places, as well as in first and second places. This is because singing styles of the songs ranked in the 10th and 12th places were different from those of the songs ranked in the first and second places. With respect to songs ranked in lower places of the retrieval results, their ranking seemed not to correctly reflect the similarities of the songs In the example in FIG. 4, for example, in retrieved songs ranked lower than 22th place, which are outside the playlist on the screen, male and female singing voices were mixed. In a normal use for retrieval, however, it is enough to show approximately top ten songs. For this reason, this incorrect reflection of the ranking does not become a problem. In some key songs sung by a plurality of singers or in some songs whose singing voices are deeply effected, retrieval results of these songs did not reflect intuitive similarities.

Next, the music information retrieval system based on voice timbre in this embodiment will be evaluated, in comparison with a conventional retrieval system that uses the MFCCs. In the conventional retrieval system targeted for the comparison, the MFCC was used as a feature, and when feature extraction is performed, the accompaniment sound reduction and the reliable frame selection were not performed. Voice timbre similarity calculation was performed in the same manner as in this embodiment.

An experiment procedure will be described. First, six university students (of four females and two males) participated in this experiment as subjects. The subjects had not received professional musical education. First, a screen as shown in FIG. 5 is presented to the subjects, and the subjects are then instructed to listen to three songs. These three songs comprise a query song (a song X in FIG. 5), a song (a song A or B in FIG. 5) ranked top by the retrieval system in this embodiment, and a song (the song B or A in FIG. 5) ranked top by the conventional retrieval system (for the comparison). Then, the subjects judge which one of the songs A and B is more similar to the query song. The subjects were not informed of which one of the songs A and B was listed as a retrieval result by the system in this embodiment, and the listening order of the songs A and B was randomized. The subjects may listen to the three songs in the order they like over and over again. As shown in FIG. 6, ten query songs were selected from the database RWC-MDB-P-2001, with attention paid so that the selected query songs are of various genres and are selected in a good gender proportion. Three-digit numbers in a table shown in FIG. 6 indicate piece numbers of the database RWC-MDB-P-2001. Retrieval results ranked top by the retrieval system in this embodiment and the conventional retrieval system (using the MFCCS) when each query song is input are listed in the same field. In the table, "J" indicates lyrics written in Japanese, while "E" indicates lyrics written in English.

In the experiment, the following two questions were asked to the subjects.

Question 1: Which one of the songs A and B is more similar to the song X in voice timbre?

Question 2: Which one of the songs A and B is more similar to the song X in overall timbre?

Figure 7:
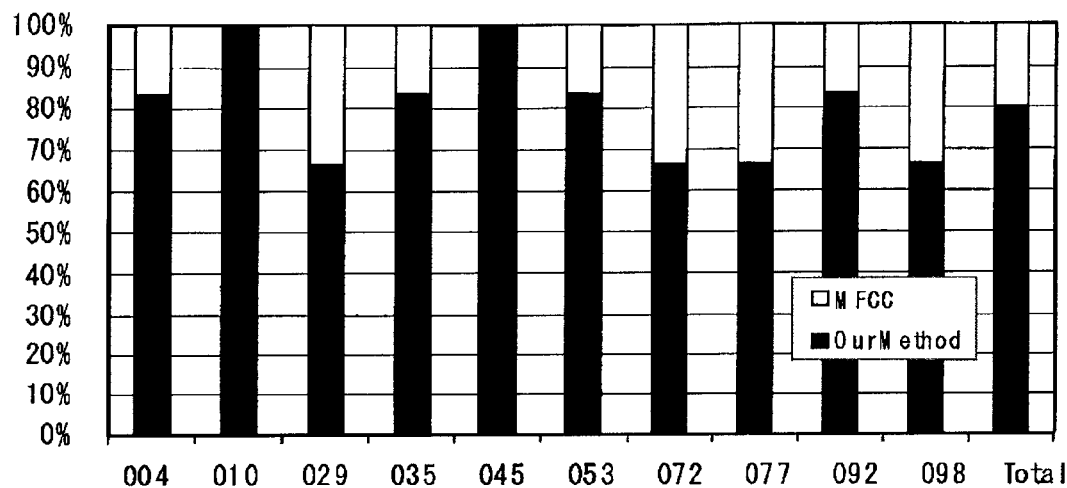
FIG. 7 is a graph showing response results for question 1 (about voice timbre).
Figure 8:
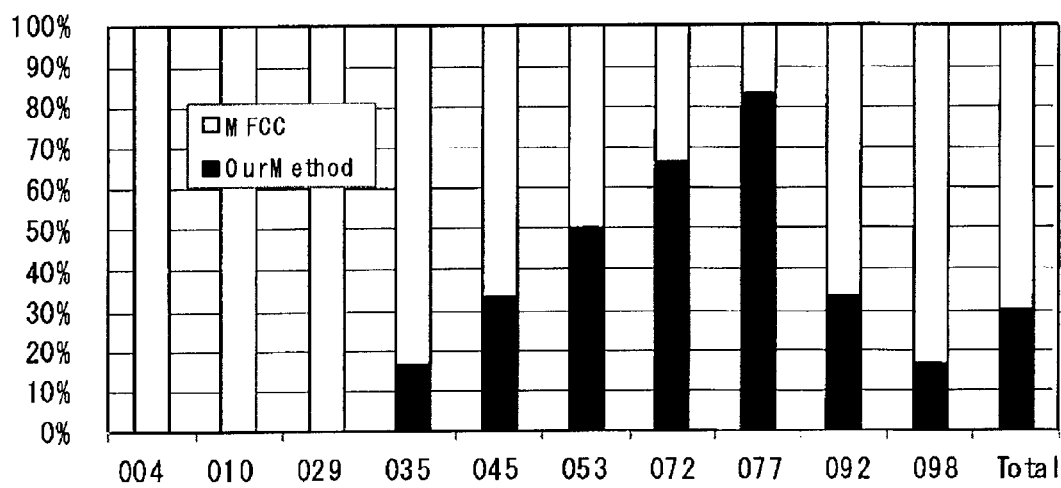
FIG. 8 is a graph showing response results for question 2 (about overall timbre).

Experiment results are shown in FIGS. 7 and 8. FIG. 7 shows response results for the question 1 about the voice timbre, while FIG. 8 shows response results for the question 2 about the overall timbre. More specifically, FIG. 7 shows, for each query song, a proportion of responses from the subjects indicating which one of retrieval results obtained by the retrieval system in this embodiment and the conventional system is more similar to the query song in voice timbre. 80% of the responses from the six subjects for the 10 query songs indicated that retrieval results obtained by the retrieval system in this embodiment were more similar to the query songs in voice timbre. On the other hand, as shown in FIG. 8, 70% of the responses from the six subjects indicated that retrieval results obtained by the conventional retrieval system were more similar to the query songs in the overall timbre. It was confirmed from these experimental results that, with the retrieval system in this embodiment, the influence of accompaniment sounds may be reduced, and songs may be retrieved based on voice timbre similarities. Referring to the table in FIG. 6, when the MFCC was used as the feature in the conventional retrieval system, four songs sung by singers of genders different from those of the query songs were actually output as retrieval results for the ten selected query songs. No such a problem has arisen in the retrieval system in this embodiment.

Further, some retrieval results obtained by the retrieval system in this embodiment were found to be similar in singing style as well as voice timbre. When the song RWC-MDB-P-2001 No. 053 was used as a query, for example, both the retrieval system in this embodiment and the conventional retrieval system retrieved the top-ranked songs sung by the same singer as the query song. However, five out of the six subjects judged that the retrieval result obtained by the retrieval system in this embodiment was more similar to the query song. The retrieval system in this embodiment was actually tested on the 75 songs through the experiment, and it was confirmed that the system was useful for retrieving songs based on voice timbre similarities. Further, in order to confirm that retrieval results by the retrieval system in this embodiment are actually based on voice timbre similarities, the subjective experiment with the six subjects was conducted, and effectiveness of the retrieval system in this embodiment could be confirmed. From this experiment, it was confirmed that the mutual information content used as the similarity measure between two songs was effective. However, the mutual information content uses all features for similarity calculation. Accordingly, it requires a long computational time and a large storage. When the operating speed of the computer to be used is increased and the price of a memory to be used is reduced, this problem will be solved. The mutual information content may be therefore sufficiently applied practically. When other similarity measure, such as an Earth Mover's Distance (EMD) disclosed in "Berenzweig, A., Logan, B., Ellis, D. P. W. and Whitman, B.: A Large-Scale Evaluation of Acoustic and Subjective Music Similarity Measures, Computer Music Journal, Vol. 28, No. 2, pp. 63-76 (2004)" is introduced, the computational time may be reduced. Further, by integrating the music information retrieval system in this embodiment with other music retrieval method, a more flexible and versatile music information retrieval system may be developed.

Figure 9:
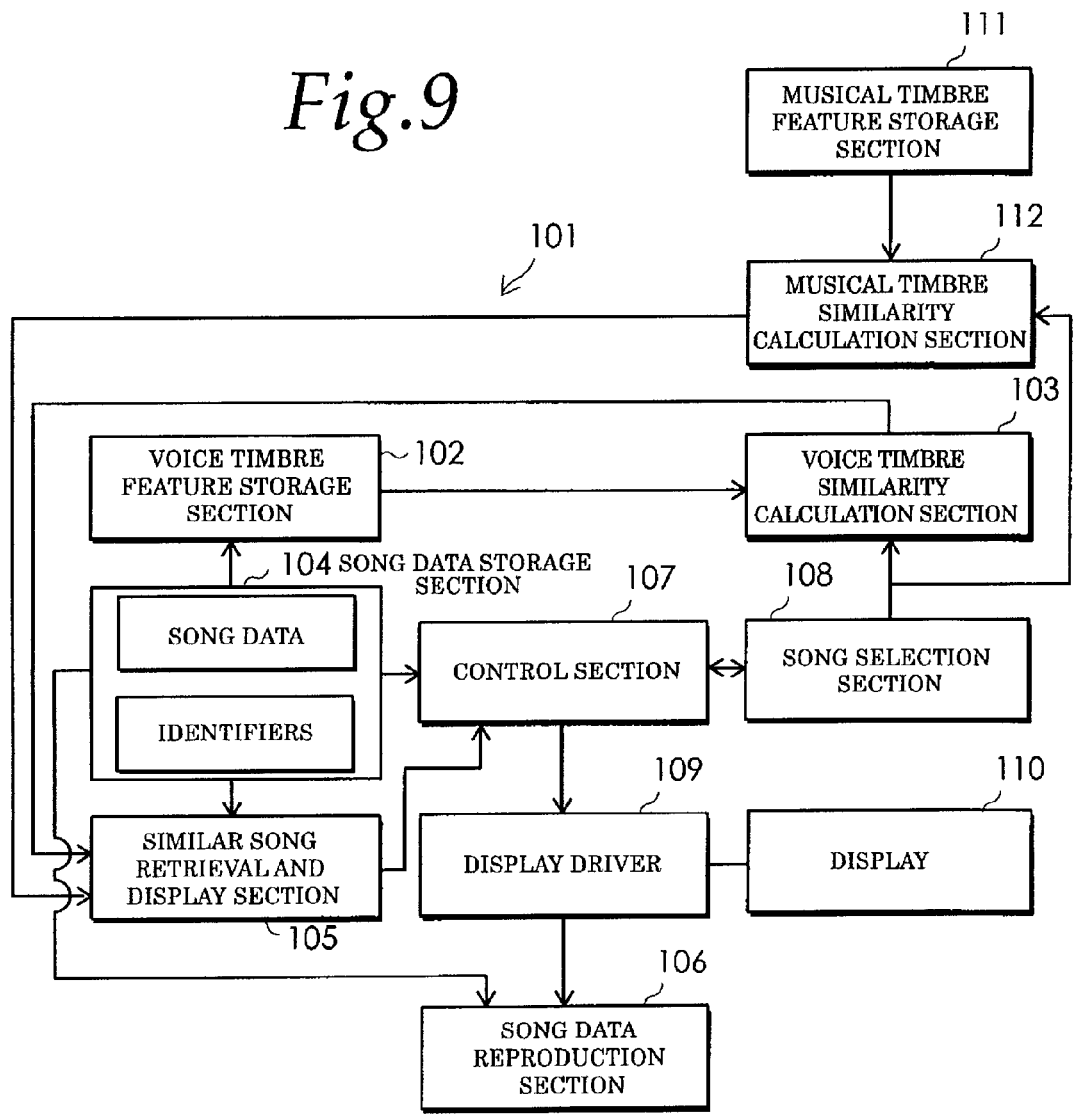
FIG. 9 is a block diagram showing a configuration of a music information retrieval system in a second embodiment of the present invention.

FIG. 9 is a block diagram showing a configuration of a music information retrieval system in a second embodiment of the present invention. In addition to retrieval of songs having singing voices with similar voice timbres, which is a feature of the first embodiment, this embodiment can select songs that have similar musical timbres as well. Referring to FIG. 9, reference numerals with 100 added thereto are assigned to blocks that are the same as those shown in FIG. 2. Description of the blocks (sections) that have the same functions as those in FIG. 2 will be omitted. The music information retrieval system 111 includes musical timbre feature storage section 111 that stores the musical timbre features of a plurality of songs and identifiers for the respective songs, in addition to voice timbre feature storage section 102 that stores the voice timbre features of the songs and the identifiers for the respective songs. The voice timbre feature storage section 102 and the musical timbre feature storage section 111 may of course comprise one storage section. In this embodiment, the voice timbre feature storage section 102 and the musical timbre feature storage section 111 comprise voice timbre feature and musical timbre feature storage section. This embodiment further includes musical timbre similarity calculation section 112. As a musical timbre feature, a feature such as Mel-Frequency Cepstrum Coefficient (MFCC), Audio Spectrum Centroid (ASC), rolloff, or flux may be used.

When one query song is selected from among a plurality of songs by song selection section 108, the musical timbre similarity calculation section 112 calculates the musical timbre similarities between the query song and the respective remaining songs, based on the musical timbre feature of the query song and the musical timbre features of the remaining songs. In other words, the musical timbre similarity calculation section 112 calculates the similarities between the musical timbre feature of the selected song and the respective musical timbre features of the remaining songs stored in the musical timbre feature storage section 111. An arbitrary method of calculating the musical timbre similarities may be employed, and calculation of the musical timbre similarities is not limited to a specific similarity calculation method. For musical timbre similarity calculation, in addition to the mutual information content, a COS measure, the EMD (Earth Mover's Distance) as a distance measure, or the like, for example, may be employed as a similarity measure between two songs.

Figure 11:
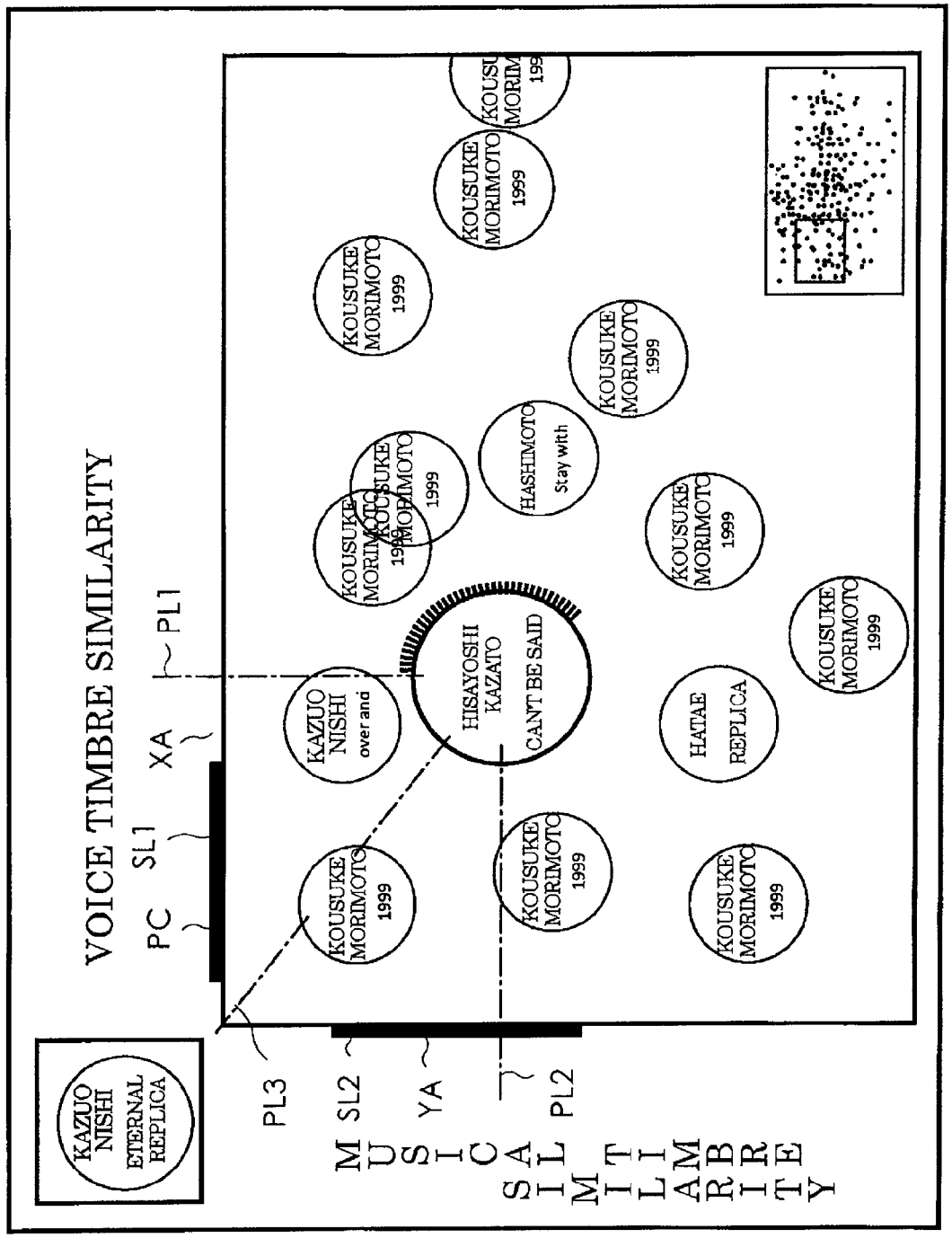
FIG. 11 is a diagram showing an example of a display format of retrieval results.

The similar song retrieval and display section 105 outputs a command to display on a screen of a display 110 a plurality of identifiers for songs which include a singing voice having the voice timbre similar to the voice timbre of the singing voice included in the selected song and have similar musical timbre, based on voice timbre similarities calculated by voice timbre similarity calculation section 103 and the musical timbre similarities calculated by the musical timbre similarity calculation section 111. Upon receipt of this command, the control section 107 outputs a command to a display driver 109 to display on the screen of the display 110 the plurality of identifiers for the songs. When retrieving a plurality of songs which include singing voice having similar voice timbre and have similar musical timbre, an average value of a voice timbre similarity and a musical timbre similarity of a song may be used as a reference. In addition, an average value of a weighted voice timbre similarity and a weighted musical timbre similarity of the song may be used as a reference for the retrieval. Then, the identifiers for the retrieved songs may be arranged on the screen of the display 110 in descending order of the average values, in the same manner as on the display in FIG. 4. Alternatively, a display format as shown in FIG. 11, in which one of a vertical axis YA and a horizontal axis XA indicates the voice timbre similarity, and the other of the vertical axis YA and the horizontal axis XA indicates the musical timbre similarity, may be employed. In the display format in FIG. 11, the horizontal axis indicates the voice timbre similarity, while the vertical axis indicates the musical timbre similarity. FIG. 11 shows a magnified view of an actually displayed rectangular portion in the lower right on the page of FIG. 11. In this display format, identifier for a song is displayed at or in the vicinity of the point of intersection of a first virtual line PL1 and a second virtual line PL2. The first virtual line PL1 is orthogonal to the horizontal axis XA at a point indicating the voice timbre similarity of the song. The second virtual line PL2 is orthogonal to the vertical axis YA at a point indicating the musical timbre similarity of the song. In the example in FIG. 11, the artist name and the title of the song are displayed as the identifier inside a circle. When the display format as shown in FIG. 11 is adopted, the identifiers for the songs may be displayed, being scattered on a plane. When retrieval results are displayed using the display format in FIG. 11, the respective identifiers which are arranged or positioned on a virtual center line PL3, has the voice timbre similarity and musical timbre similarity that are equal to each other. The virtual center line PL3 extends from a point of intersection between the vertical axis YA and the horizontal axis XA in a 45-degree angle direction between the vertical axis YA and the horizontal axis XA. Wherein the identifier for a song whose voice timber similarity and musical timbre similarity are both the largest, is arranged located on the point of intersection between the vertical axis YA and the horizontal axis XA, the songs corresponding to the identifiers in the vicinity of the point of intersection are similar to the song on the point of intersection in both voice timbre and musical timbre. Therefore, by selecting the identifier in the vicinity of the point of intersection, it becomes possible to quickly identify a song that is similar both in voice timbre and musical timbre.

In the display format (interface) in FIG. 11, the voice timbre similarities and the musical timbre similarities between a query song and the respective remaining songs targeted for retrieval are visualized on the plane. The user can thereby search for songs similar to the query song in voice timbre and musical timbre by an intuitive operation. Each circle in FIG. 11 represents one song. A song in an upper-left region (which is "Eternal Replica" by "Kazuo Nishi") on the page of FIG. 11 is a query song presented by a user. A large region in the center of FIG. 11 displays a portion of the plane (hereinafter referred to as a similarity plane) on which the songs targeted for retrieval are plotted in the order of the voice timbre similarity in a horizontal axis direction and in the order of the musical timbre similarity in a vertical axis direction. A song displayed in a more leftward position in the similarity plane is more similar to the query song in voice timbre. A song displayed in a more upward position of the similarity plane is more similar to the query song in musical timbre.

A slider SL1 arranged along the horizontal axis XA and a slider SL2 arranged along the vertical axis YA indicate a position of a currently displayed region in the similarity plane. By moving the sliders SL1 and/or SL2, an arbitrary region can be displayed. Further, by dragging an arbitrary point in a region of the similarity plane as well, a display region of the similarity plane can be changed. A small region having a lot of points in the lower right on the page of FIG. 11 indicates a distribution of the songs targeted for retrieval on the overall similarity plane. One point corresponds to each song. A small rectangular area in the small region indicates a range being currently displayed in the center of FIG. 11. By directly clicking this small area as well, the user can change the display region of the similarity plane.

A portion of the similarity plane is displayed in the large region in the center of FIG. 11. Scaling of the similarity plane portion may be freely changed. More specifically, by reducing magnification of the similarity plane portion, a lot of songs can be displayed on the screen. Alternatively, by increasing the magnification of the similarity plane portion the number of songs to be displayed on the screen can be reduced, and retrieval results may become easy understand. The magnification can be independently changed for the horizontal and vertical axes.

When the user clicks a circle that represents a song, reproduction of the song is started. The circle that represents the song being reproduced may be depicted distinguishably from other circles. A reproduction position of the song may be indicated with a line pattern which is depicted along the circumference of the circle. In the example in FIG. 11, "Can't be said" by "Hisayoshi Kazato" is being reproduced, and the line pattern shows that approximately 40% of the song has been already reproduced. When reproducing the song, only a chorus section of the song may be reproduced so that the user can readily search for songs. The chorus section may be detected in advance by a known chorus section automatic detection method.

Figure 10:
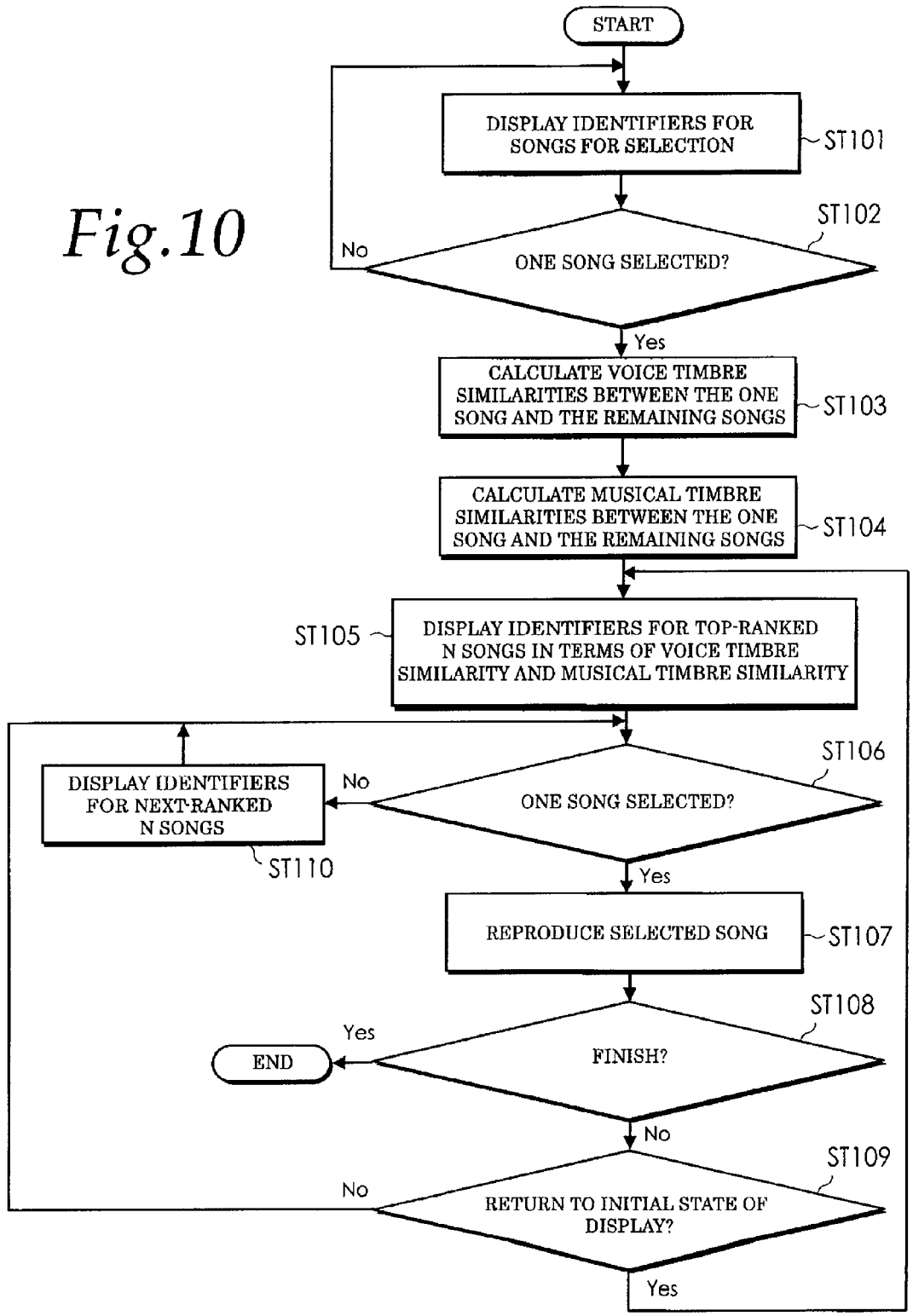
FIG. 10 is a flow chart showing an algorithm for a program used when the music information retrieval system shown in FIG. 9 is implemented by a computer.

FIG. 10 is a flow chart showing an algorithm for a program used for the music information retrieval system 101 in FIG. 9 which is implemented by a computer. Before the program is executed in the computer, as a preparatory stage, the voice timbre features of a plurality of songs and a plurality of identifiers for the respective songs are stored in the voice timbre feature storage section 102. Further, the musical timbre features of the songs and the identifiers for the respective songs are stored in the musical timbre feature storage section 111. Then, a plurality of song data in connection with the identifiers is stored in song data storage section 104. In step ST101, the identifiers for the songs for selection are displayed on the screen of the display. If one song is selected from among the songs for selection in step ST102, the operation proceeds to step ST103. In step ST103, based on the voice timbre feature of the selected one song and the voice timbre features of the remaining songs, voice timbre similarities between the one song and the respective remaining songs are calculated. Then, the operation proceeds to step ST104. In step ST104, musical timbre similarities between the one song and the respective remaining songs are calculated. Then, in step ST105, based on the voice timbre similarities calculated by the voice timbre similarity calculation section 103 and the musical timbre similarities calculated by the musical timbre similarity calculation section 112, the identifiers for top-ranked N songs including the singing voice that have the voice timbre similar to the voice timbre of the singing voice included in the one song and having a musical timbre similar to the musical timbre of the one song are shown on the display. In step ST106, one identifier is selected from among the identifiers displayed on a candidate list display portion L on the display 110 by clicking. In step ST107, song data corresponding to the selected identifier is extracted from the plurality of song data stored in the song data storage section 104 and is reproduced by the song data reproduction section. If identifier for the song desired to be selected is not displayed among the plurality of identifiers displayed on the candidate list display portion L, a plurality of the identifiers on next-ranked N songs is displayed in step ST110. If the one song has been reproduced in step ST107 and another song is then to be reproduced, the operation proceeds to step ST109. In step ST109, it is determined whether display of the candidate list display portion L is returned to an initial state or not. If the display is returned to the initial state, the operation is returned to step ST105. If song selection is made again using the candidate songs currently displayed without returning the display to the initial state, the operation is returned to step ST106. A plurality of the songs may be selected in step ST106. According to the second embodiment, it becomes possible to come across an unknown song that is similar to a song the user likes both in voice timbre and musical timbre.

Figure 12:
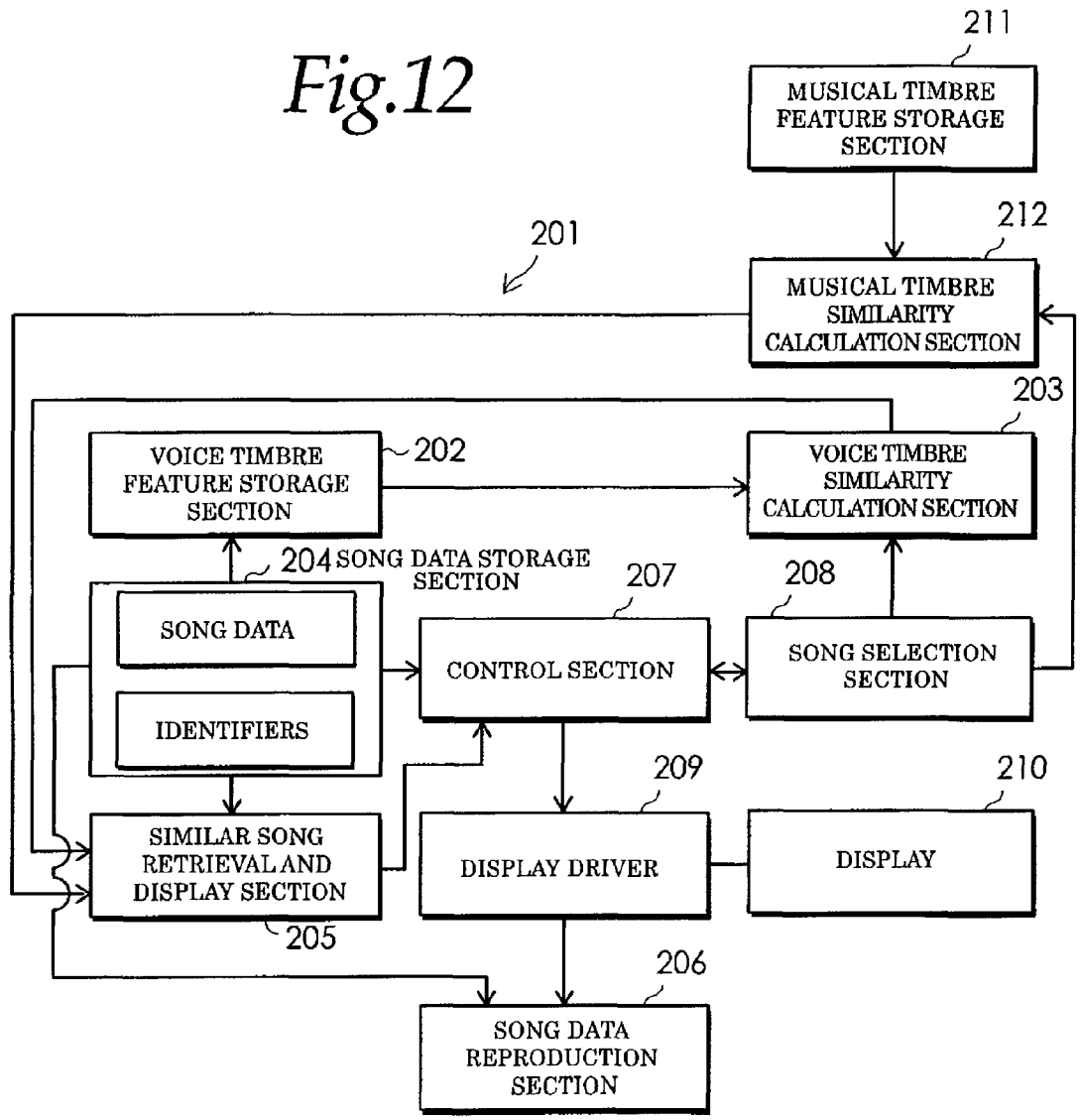
FIG. 12 is a block diagram showing a configuration of a music information retrieval system in a third embodiment of the present invention.
Figure 13:
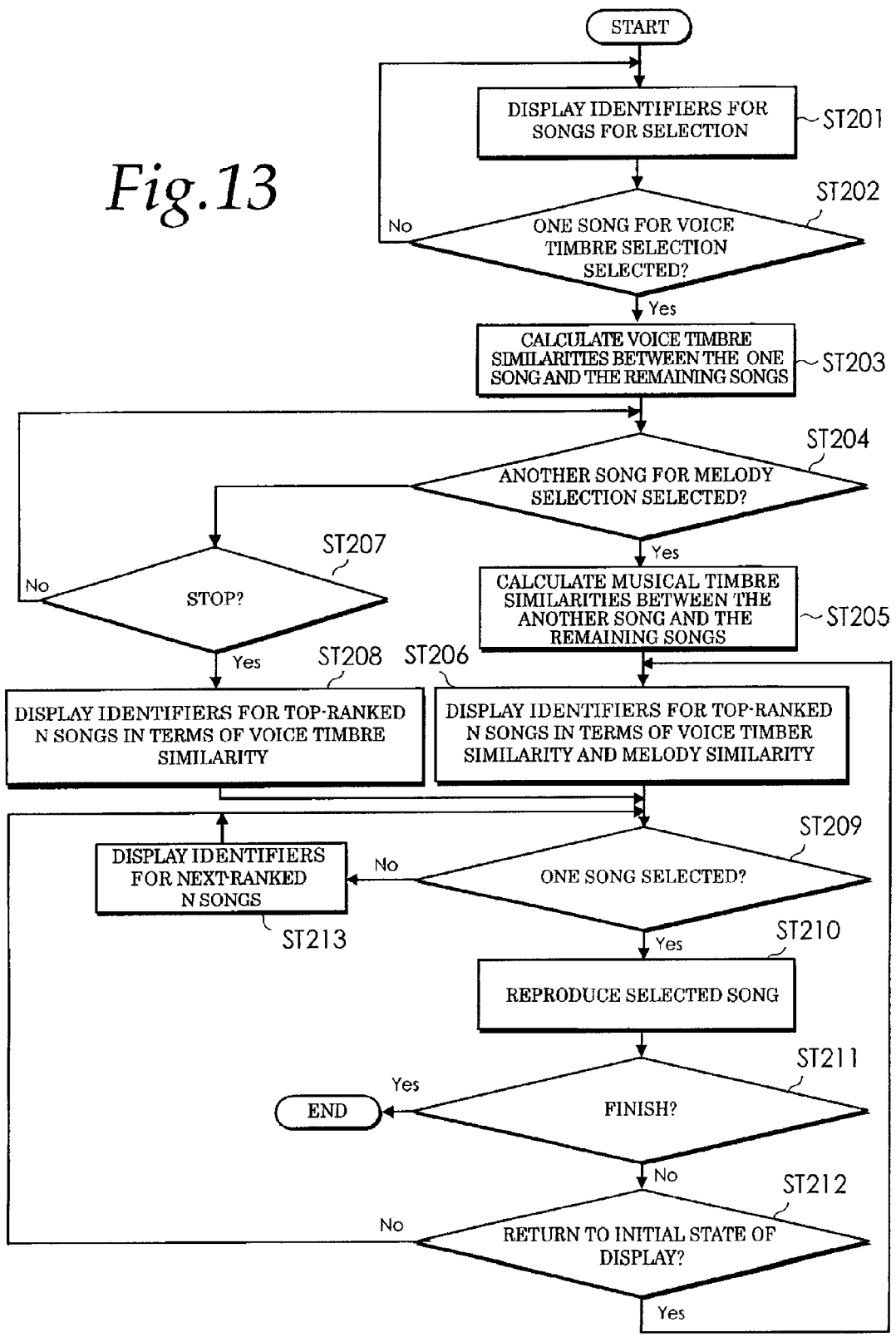
FIG. 13 is a flowchart showing an algorithm for a program used when the music information retrieval system shown in FIG. 12 is implemented by a computer.

A query song used for retrieving songs with similar voice timbres may be different from a query song used for retrieving songs with similar musical timbres. By using the two different query songs, songs that are similar to a certain song (such as a rock song sung by one female) in voice timbre and that are similar to another song (such as a pop song sung by a chorus group) in musical timbre may be retrieved. FIG. 12 is a block diagram showing a configuration of a third embodiment of a music information retrieval system of the present invention for implementing such retrieval. FIG. 13 is a flowchart of a program used when the embodiment shown in FIG. 12 is implemented by a computer. In the music information retrieval system in the third embodiment, songs including a singing voice that have the voice timbre similar to the voice timbre of a certain song and having musical timbre similar to the musical timbre of another song maybe retrieved. Referring to FIG. 12, reference numerals obtained by adding 100 to reference numerals assigned to the blocks shown in FIG. 9 are assigned to blocks that are the same as those in the configuration of the second embodiment. Descriptions of the blocks (sections) that have the same functions as those in FIG. 9 will be omitted. In a music information retrieval system 201, song selection section 208 is used for selecting songs that have similar voice timbres and songs that have similar musical timbres.

Figure 14:
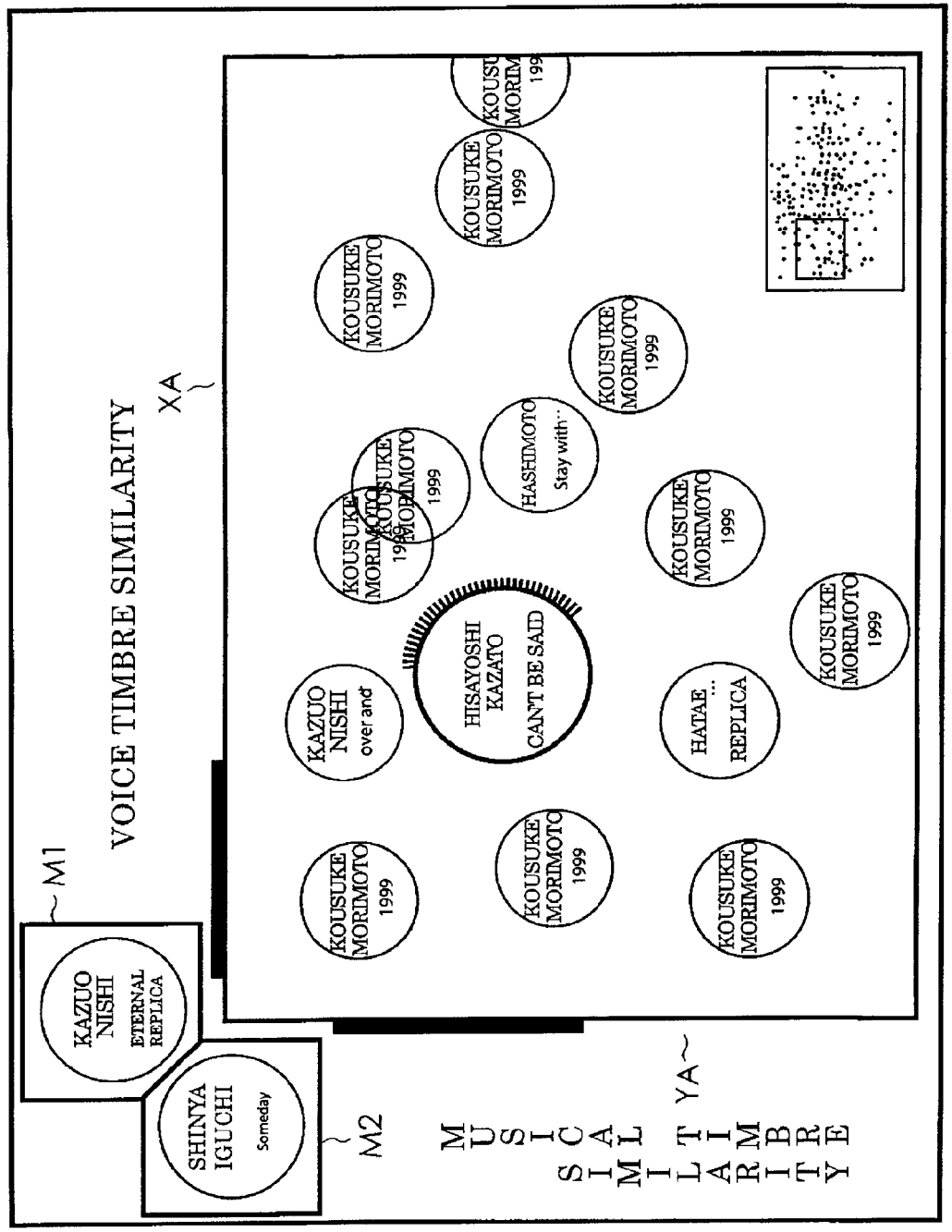
FIG. 14 is a diagram showing a display format of retrieval results by the music information retrieval system in FIG. 12.

In the third embodiment as well, a voice timbre feature storage section 202 and a musical timbre feature storage section 211, a voice timbre similarity calculation section 203, a musical timbre similarity calculation section 212, and a similar song retrieval and a display section 205, and a song data reproduction section 206 are used. If one song M1 is selected from among a plurality of songs by the song selection section 208, based on the voice timbre feature of the one song M1 and the voice timbre features of the remaining songs, the voice timbre similarity calculation section 202 calculates voice timbre similarities between the one song M1 and the respective remaining songs. If another song M2 is selected from among the songs, based on the musical timbre feature of the another song M2 and the musical timbre features of the remaining songs, the musical timbre similarity calculation section 212 calculates musical timbre similarities between the another song M2 and the respective remaining songs. Then, the similar song retrieval and display section 205 outputs to control section 207 a command to display on a display 210 a plurality of identifiers for songs similar to the one song M1 in voice timbre and the another song M2 in musical timbre, based on the voice timbre similarities calculated by the voice timbre similarity calculation section 202 and the musical timbre similarities calculated by the musical timbre similarity calculation section 212. An arbitrary display format may be used for displaying the identifiers on the display 210. A display format as shown in FIG. 14, for example, in which one of a vertical axis YA and a horizontal axis XA indicates the voice timbre similarities, and the other of the vertical axis YA and the horizontal axis XA indicates the musical timbre similarities, as in the display format in FIG. 11, may be employed. In the display format in FIG. 14, the horizontal axis indicates the voice timbre similarity, while the vertical axis indicates the musical timbre similarity. In the display format in FIG. 14, an identifier for a song is displayed at or in the vicinity of the point of intersection of a first virtual line and a second virtual line. The first virtual line is orthogonal to the horizontal axis XA at a point indicating the voice timbre similarity of the song. The second virtual line is orthogonal the vertical axis YA at a point indicating the musical timbre similarity of the song. According to this display format, a plurality of songs similar to the one song M1 in voice timbre and the another song M2 in musical timbre can be recognized at a glance, together with degrees of the similarities.

In contrast with the display format in FIG. 11, in the display format (interface) in FIG. 14, two regions on the upper left on the page of FIG. 14 are used for displaying the two query songs M1 and M2. The query song M1 used for calculating voice timbre similarities may be different from the query song M2 used for calculating musical timbre similarities. With this embodiment, even if a user likes the singing voice of a certain song but does not like the musical timbre of the song, he may search for songs whose singing voice and musical timbre he like, from among songs targeted for retrieval. In this embodiment, the interface may be operated by the same manner as that in FIG. 11. By plotting retrieval results on a similarity plane, the user may search for his favorite songs by an intuitive operation.

If the program having the algorithm shown in FIG. 13 is executed by the computer, the voice timbre features of a plurality of songs and a plurality of identifiers for the songs are stored in the voice timbre feature storage section 202, as a preparatory stage. Further, the musical timbre features of the songs and identifiers for the songs are stored in the musical timbre feature storage section 211. Then, a plurality of song data is stored in the song data storage section 204, together with or in connection with the identifiers. Then, in step ST201, the identifiers for the songs for selection are displayed on a screen of the display. If one query song for voice timbre selection is selected from among the songs for selection in step ST202, the operation proceeds to step ST203. In step ST203, based on the voice timbre features of the selected one song and the remaining songs, voice timbre similarities between the selected one song and the respective remaining songs are calculated. Next, in step ST204, another query song is selected from among the songs for musical timbre selection. Then, in step ST205, based on the musical timbre features of the selected another song and the remaining songs, musical timbre similarities between the selected another song and the respective remaining songs are calculated. Next, in step ST206, based on the voice timbre similarities calculated by the voice timbre similarity calculation section 203 and the musical timbre similarities calculated by the musical timbre similarity calculation section 212, the identifiers for top-ranked N songs that are similar to the one query song in voice timbre and are similar to the another query song in musical timbre are displayed on the screen of the display. Then, in step ST209, one identifier is selected from among the identifiers displayed on a candidate list display portion L on the display 210, by clicking. Song data corresponding to the selected identifier is extracted from among the plurality of song data stored in the song data storage section 204 and is reproduced by the song data reproduction section 206, in step ST210. If an identifier for a song desired to be selected is not displayed among the identifiers displayed on the candidate list display portion L, the identifiers for next-ranked 10 songs are displayed in step ST213. If another song is reproduced after one song has been reproduced in step ST210, the operation proceeds from step ST211 to step ST212. In step ST212, it is determined whether the display on the candidate list display portion L is returned to an initial state or not. If the display is returned to the initial state, the operation is returned to step ST206. If song selection is made again from the current candidates, the operation is returned to step ST209. The songs may be selected in step ST209. If another query song for musical timbre selection is not selected in step ST204, the operation proceeds to step ST207. Then, it is determined whether the selection based on the musical timbre similarity is stopped or not. When the selection based on the musical timbre similarity is stopped in step ST207, the operation proceeds to step ST208, and only retrieval of the songs based on the voice timbre similarity is executed. In other words, in step ST208, the identifiers for top-ranked N songs selected based on the voice timbre similarity are displayed on the display 210. Then, procedures that are the same as those in steps ST209 to ST213 are performed.

According to the third embodiment, it becomes possible to come across an unknown song which is similar to a song the user likes in voice timbre and which is similar to another song the user likes in musical timbre.

Figure 15:
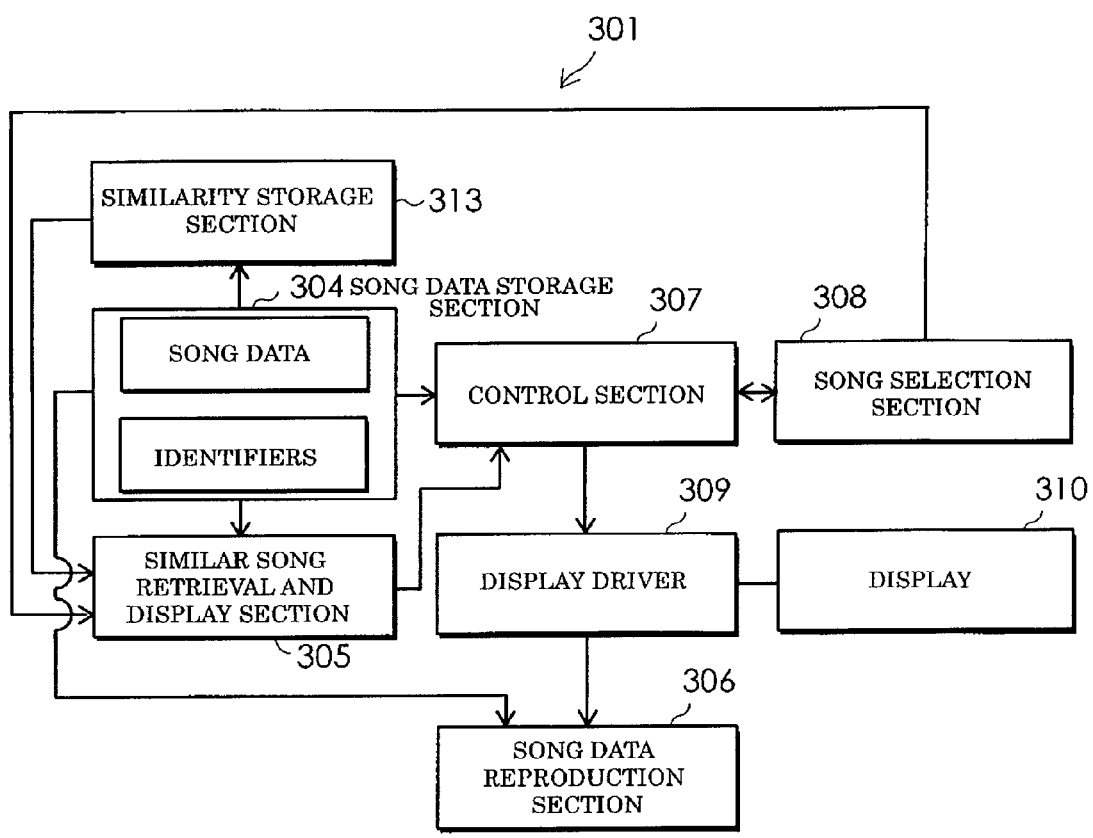
FIG. 15 is a block diagram of a music information retrieval system in a fourth embodiment of the present invention, where similarities are calculated in advance and are stored in similarity storage section.

In the embodiments described above, similarity calculation is made for each of retrievals. The voice timbre similarities and musical timbre similarities may be calculated in advance and may be stored in similarity storage section. FIG. 15 is a block diagram showing a configuration of a fourth embodiment in which the similarities are calculated in advance and are then stored in the similarity storage section. Referring to FIG. 15, reference numerals with 300 added thereto are assigned to blocks that are the same as those in the first embodiment, shown in FIG. 2. For retrieval of songs which include a singing voice that have the voice timbre similar to the vice timbre of the singing song included in a certain song, identifiers for the songs and voice timbre similarities between each one of songs and the respective remaining songs calculated based on the voice timbre features of each one of the songs and the remaining songs are stored in similarity storage section 313. When one song is selected from among the songs, similar song retrieval and display section 305 reads out the voice timbre similarities between the one song and the respective remaining songs from the similarity storage section 313, and displays the identifiers for the songs including a singing voice that have the voice timbre similar to the voice timbre of the singing song included in the one song on a screen of a display 310 through a control section 307 and a display driver 309, based on the voice timbre similarities. With this embodiment, a retrieval time may be reduced because the similarities are calculated in advance.

Figure 16:
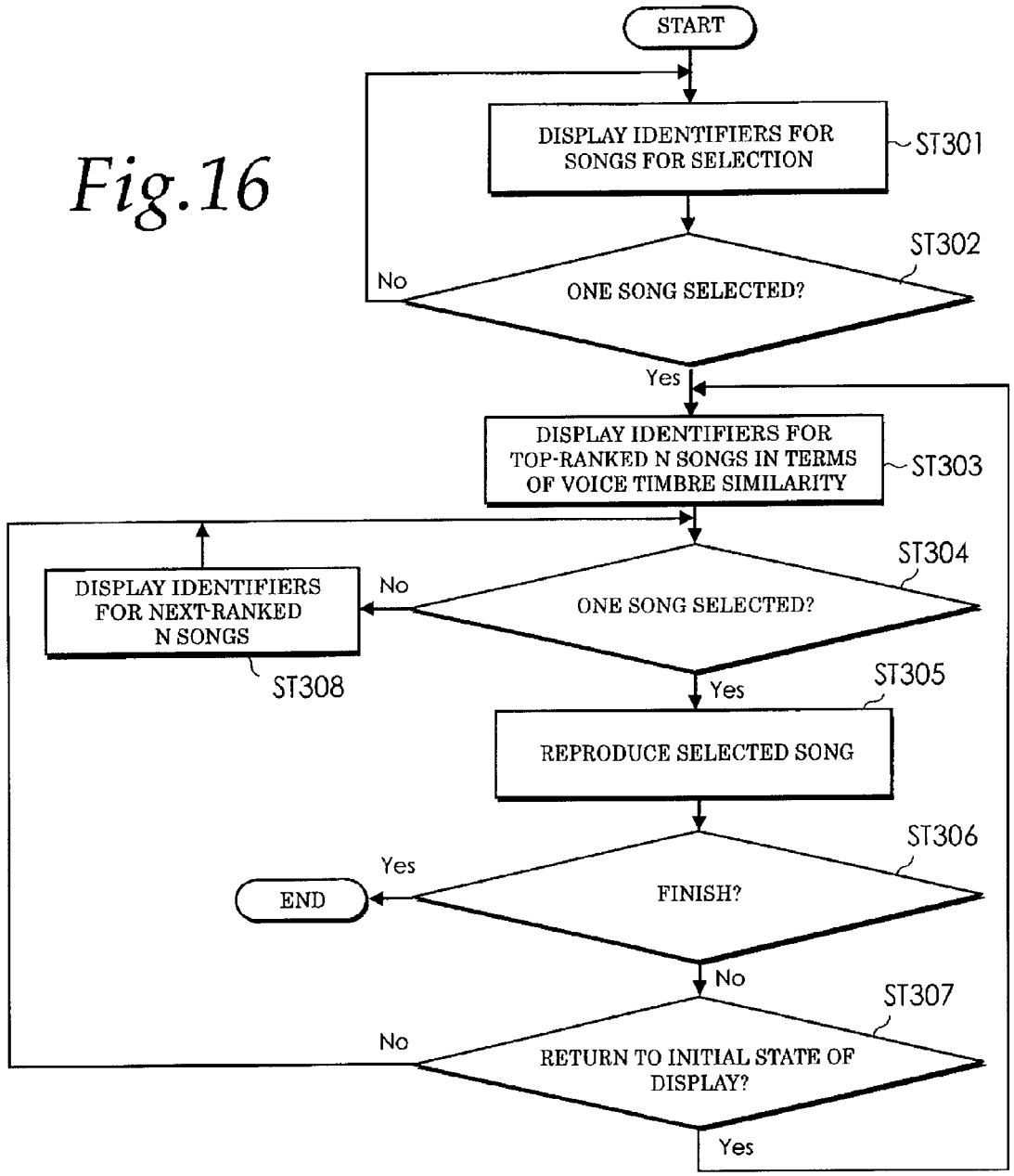
FIG. 16 is a flowchart showing an algorithm for a program used when the music information retrieval system shown in FIG. 15 is implemented by a computer.

FIG. 16 is a flowchart showing an algorithm for a program used when a music information retrieval system 301 in the fourth embodiment, shown in FIG. 15 is implemented by a computer. If the program is executed by the computer, identifiers for the songs and the voice timbre similarities between each one of the songs and the respective remaining songs calculated based on the voice timbre features of each one of the songs and the remaining songs are stored in the similarity storage section 313, as a preparatory stage. Then, the identifiers for songs for selection are displayed on the display in step ST301. If one song is selected from among the songs for selection in step ST302, the operation proceeds to step ST303. In step ST303, the identifiers for top-ranked N songs similar to the one song in voice timbre is displayed on the screen of the display, based on the voice timbre similarities stored in the similarity storage section 313. Procedures in steps ST304 through ST308 are the same as those in steps ST5 to ST9 in FIG. 3.

If songs with similar voice timbre and similar musical timbre are retrieved, the voice timbre similarities between each one of the songs and the respective remaining songs calculated based on the voice timbre features of each one of the songs and the remaining songs, musical timbre similarities between each one of the songs and the respective remaining songs calculated based on the musical timbre features of each one of the songs and the remaining songs, and identifiers for the respective songs may be stored in the similarity storage section 313. If one song is selected from among the songs, the similar song retrieval and display section 305 reads out the voice timbre similarities and the musical timbre similarities between the one song and the respective remaining songs from the similarity storage section 313. Then, the similar song retrieval and display section 305 displays on the screen of the display 310 the identifiers for the songs including singing voice that have the voice timbre similar to the voice timbre of the singing voice included in the one song and having the musical timbre similar to the musical timbre of the one song, based on the voice timbre similarities and the musical timbre similarities.

FIG. 17 is a flowchart showing an algorithm for a program used when the music information retrieval system 301 with the similarity storage section 313 storing both of the vocal timber similarities and the musical timbre similarities is implemented by the computer. This flowchart is different from the flowchart shown in FIG. 16 only in step ST403, where in addition to the voice timbre similarities, the musical timbre similarities are also used for retrieval. Procedures in steps ST401 to ST408 excluding step ST403 are substantially the same as those in steps ST301 to ST308 excluding step ST303 in FIG. 16.

If a query song for voice timbre selection is different from a query song for musical timbre selection, and retrieval is performed based on the voice timbre similarities and the musical timbre similarities, as in the embodiment shown in FIG. 15, all the similarities maybe of course calculated in advance, and stored in the similarity storage section 313. Then, retrieval may be performed, as in the embodiment shown in FIG. 15.

While the preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A music information retrieval system comprising:
a voice timbre feature and musical timbre feature storage section for storing voice timbre features of singing voices included in a plurality of songs, musical timbre features of the plurality of songs and a plurality of identifiers for the respective songs;
a song data storage section for storing a plurality of song data of the songs in connection with the identifiers;
a voice timbre similarity calculation section for calculating voice timbre similarities between one song and the respective remaining songs based on the voice timbre features of the one song and the remaining songs when the one song is selected from among the songs;
a musical timbre similarity calculation section for calculating musical timbre similarities between the one song or another song and the respective remaining songs based on the musical timbre features of the one song or another song and the remaining songs when the one song or another song is selected from among the songs;
a similar song retrieval and display section for retrieving a plurality of identifiers for songs including a singing voice that have the voice timbre similar to the voice timbre of the singing voice included in the one song or another song and having a musical timbre similar to the musical timbre of the one song or another song, based on the voice timbre similarities calculated by the voice timbre similarity calculation section and the musical timbre similarities calculated by the musical timbre similarity calculation section; and
a song data reproduction section for extracting from the plurality of song data stored in the song data storage section one or more song data corresponding to one or more identifiers which are selected from among the plurality of identifiers displayed on the display, and reproducing the one or more song data, wherein:
the similar song retrieval and display section displays the plurality of identifiers for the songs on the display, using a display format that allows magnitude relations of both the voice timbre similarities and the musical timbre similarities to be recognized;
the display format has vertical and horizontal axes, one of the vertical and horizontal axes indicating the voice timbre similarity and the other of the vertical and horizontal axes indicating the musical timbre similarity; and
the identifier for the one song is displayed at or in the vicinity of a point of intersection of a first virtual line and a second virtual line, the first virtual line being orthogonal to the one of the vertical and horizontal axes at a point indicating a voice timbre similarity of the one song, the second virtual line being orthogonal to the other of the horizontal and vertical axes at a point indicating a musical timbre similarity of the one song.

2. A music information retrieval system comprising:
a similarity storage section for storing a plurality of voice timbre similarities between each one of a plurality of songs and the respective remaining songs, calculated based on voice timbre features of each one of the songs and the remaining songs, a plurality of musical timbre similarities between each one of the songs and the respective remaining songs calculated based on musical timbre features of each one of the songs and the remaining songs, and
a song data storage section for storing a plurality of song data of the songs in connection with the identifiers;
a similar song retrieval and display section for reading out the voice timbre similarities and the musical timbre similarities between one song and the respective remaining songs from the similarity storage section when the one song is selected from among the songs, and retrieving a plurality of identifiers for the songs including a singing voice that have the voice timbre similar to the voice timbre of the singing voice that have the voice timbre similar to the voice timbre of a singing voice included in the one song and having a musical timbre similar to the musical timbre of the one song, based on the voice timbre similarities; and
a song data reproduction section for extracting from the plurality of song data stored in the song data storage section one or more song data corresponding to one or more identifiers which are selected from among the plurality of identifiers displayed on the display, and reproducing the one or more song data, wherein
the similar song retrieval and display section displays the plurality of identifiers for the songs on the display, using a display format that allows magnitude relations of both the voice timbre similarities and the musical timbre similarities to be recognized;
the display format has vertical and horizontal axes, one of the vertical and horizontal axes indicating the voice timbre similarity and the other of the vertical and horizontal axes indicating the musical timbre similarity; and
the identifier for the one song is displayed at or in the vicinity of a point of intersection of a first virtual line and a second virtual line, the first virtual line being orthogonal to the one of the vertical and horizontal axes at a point indicating a voice timbre similarity of the one song, the second virtual line being orthogonal to the other of the horizontal and vertical axes at a point indicating a musical timbre similarity of the one song.

* * * * *